(12) United States Patent
Mukawa

(10) Patent No.: US 7,139,109 B2
(45) Date of Patent: Nov. 21, 2006

(54) TRANSMISSION TYPE LAMINATED HOLOGRAM OPTICAL ELEMENT AND IMAGE DISPLAY DEVICE COMPRISING THIS OPTICAL ELEMENT

(75) Inventor: Hiroshi Mukawa, Kanagawa (JP)

(73) Assignee: Sony Corporation (JP)

( * ) Notice: Subject to any disclaimer, the term of this patent is extended or adjusted under 35 U.S.C. 154(b) by 273 days.

(21) Appl. No.: 10/492,590

(22) PCT Filed: Oct. 29, 2002

(86) PCT No.: PCT/JP02/11241

§ 371 (c)(1),
(2), (4) Date: Apr. 15, 2004

(87) PCT Pub. No.: WO03/038485

PCT Pub. Date: May 8, 2003

(65) Prior Publication Data

US 2004/0257628 A1    Dec. 23, 2004

(30) Foreign Application Priority Data

Oct. 31, 2001    (JP) ............................ 2001-335404

(51) Int. Cl.
  *G02B 5/32* (2006.01)
  *G03H 1/26* (2006.01)
(52) U.S. Cl. ......................................... 359/22; 359/15
(58) Field of Classification Search ............... 359/22, 359/24, 25, 15
See application file for complete search history.

(56) References Cited

U.S. PATENT DOCUMENTS

| 5,499,118 A | 3/1996 | Wreede et al. |
| 6,115,152 A | 9/2000 | Popovich et al. |
| 2002/0001109 A1* | 1/2002 | Hamano et al. ............... 359/9 |
| 2002/0154348 A1* | 10/2002 | Takada et al. ................ 359/15 |
| 2006/0044638 A1* | 3/2006 | Takagi ........................ 359/15 |

FOREIGN PATENT DOCUMENTS

| JP | 8-171340 A | 7/1996 |
| JP | 09-189809 | 7/1997 |
| JP | 10-048423 | 2/1998 |
| JP | 11-258426 A | 9/1999 |
| JP | 11-271536 A | 10/1999 |
| JP | 2002-525646 A | 8/2002 |
| WO | WO 99/24852 A1 | 5/1999 |

OTHER PUBLICATIONS

M.G. Moharam and T.K. Gayload, Rigorous Coupled-wave Analysis of Planar Grating Diffraction, J. Opt. Soc. Am., 71, 811-818 (1977).
M.G. Moharam and T.K. Gayload, Rigorous Coupled-wave Analysis of Grating Diffraction E-mode Polarization and Losses, J. Opt. Soc. Am 73, 451-455 (1983).
International Search Report dated Feb. 12, 2003.

* cited by examiner

*Primary Examiner*—Fayez G. Assaf
(74) *Attorney, Agent, or Firm*—Rader, Fishman, & Grauer PLLC; Ronald P. Kananen

(57) ABSTRACT

The present invention is directed to a transmission type laminated hologram optical element constituting an image display apparatus, wherein plural transmission type hologram optical elements (13), (14), (15) where diffraction acceptance incident angles are different from each other are laminated. The respective transmission type hologram optical elements are adapted so that outgoing angles with respect to center incident angles of respective diffraction acceptance incident angles at an arbitrary wavelength of the visible region are different from each other, whereby a diffraction acceptance angle of incident light can be broadened, light utilization efficiency is permitted to be high, and distance with respect to color pixels of the spatial light modulation element can be optimally set from viewpoints of light utilization efficiency.

62 Claims, 16 Drawing Sheets

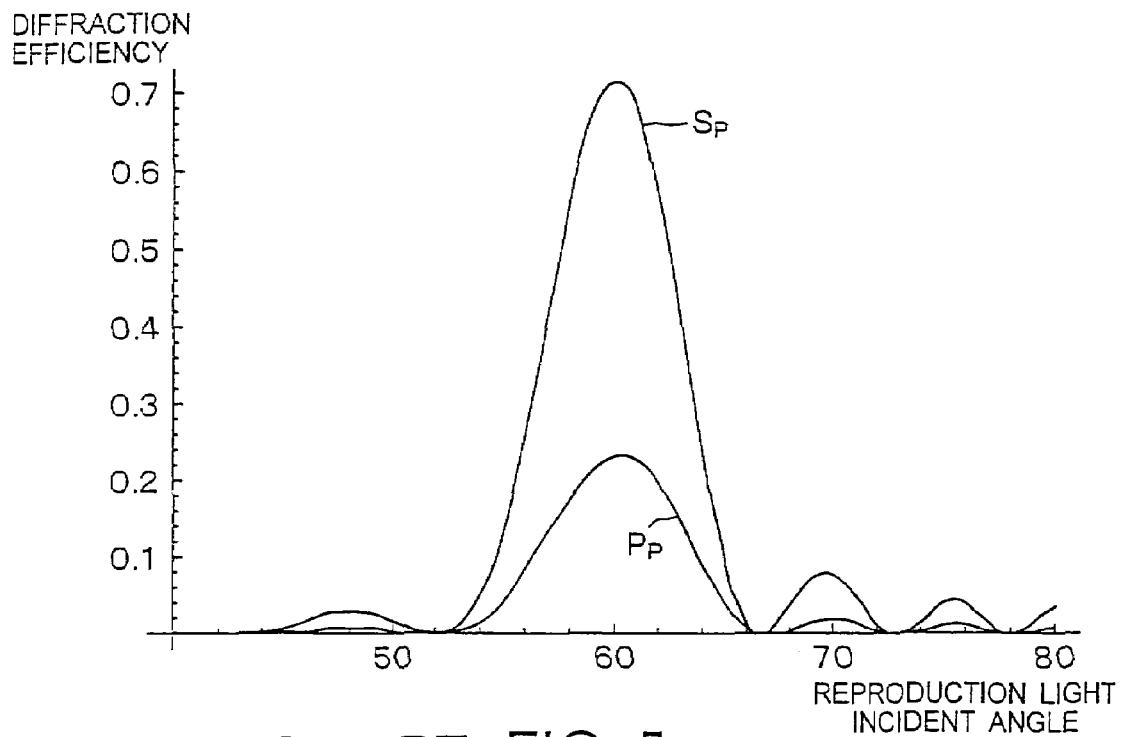
PRIOR ART FIG. 5
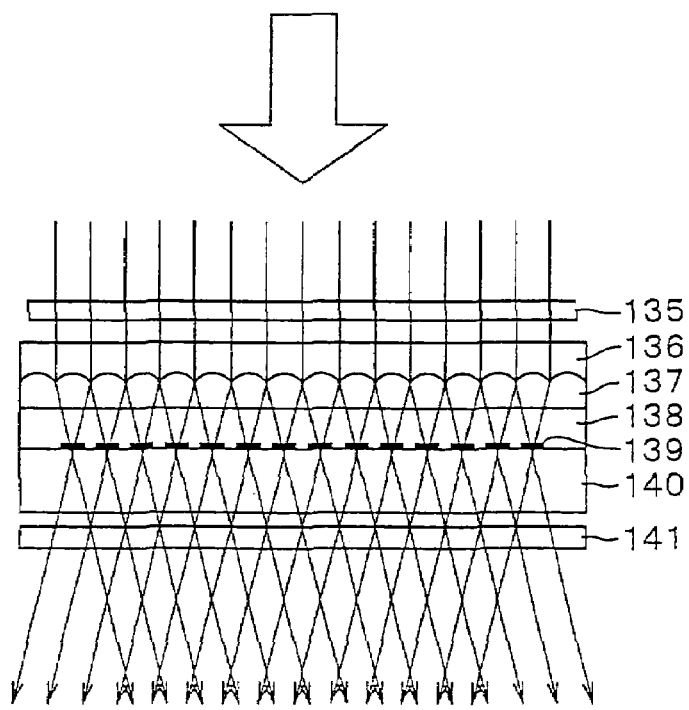
FIG. 6 PRIOR ART

TRANSMISSION TYPE LAMINATED HOLOGRAM OPTICAL ELEMENT AND IMAGE DISPLAY DEVICE COMPRISING THIS OPTICAL ELEMENT

TECHNICAL FIELD

The present invention relates to a transmission type laminated hologram optical element of wide angle of view, and further relates to an image display device and an image display apparatus using such transmission type laminated hologram optical element.

This Application claims priority of Japanese Patent Application No. 2001-335404, filed on Oct. 31, 2001, the entirety of which is incorporated by reference herein.

BACKGROUND ART

As a projection type image display apparatus using a reflection type spatial light modulation element, e.g., reflection type TN liquid crystal panel, an image display apparatus constituted as shown in FIG. 1 is conventionally proposed. In this image display apparatus, light beams emitted from a lamp light source 107 are incident on an illumination optical system 108 having functions such as correction of light beam cross sectional shape, uniformization of intensity and divergence angle control, etc. This illumination optical system 108 includes a P-S polarization converter (not shown). This P-S polarization converter has a function to arrange light beams in non-polarization state into any one of P-polarized light and S-polarized light at efficiency of 50% or more.

In the image display apparatus shown here, light beams which have been passed through the illumination optical system 108 are placed in the polarization state where the electric vector vibrates mainly in a direction perpendicular to paper surface of FIG. 1. The polarization direction in this polarization state, which is S-polarized light, is with respect to the reflection surface of a dichroic mirror 109 of red light reflection which is incident next. Namely, in light beams which have been passed through the illumination optical system 108, the traveling direction of only the red light component is deflected by 90° by the dichroic mirror 109 of red light reflection. The light beams of red light component are reflected by a mirror 110, and are incident on a polarization beam splitter for red light (hereinafter referred to as PBS for red) 111. At a dielectric film 111a of the red PBS 111, only the S-polarized light component is reflected, and is incident on a reflection type TN liquid crystal panel 113 for red light as incident polarized light 112.

In the reflection type TN liquid crystal panel 113 for red light, incident light beams are reflected in such a manner that the polarization state is modulated in accordance with the display image. The light beams which have been reflected by the red light reflection type TN liquid crystal panel 113 are incident on the dielectric film 111a of the red PBS 111 for a second type. At this dielectric film 111a, light beams are detected so that only P-polarized light is transmitted therethrough, whereby polarization modulation is converted into luminance modulation. The outgoing light beams which have been converted into luminance modulation in this way are incident on a cross dichroic prism 114.

On the other hand, light beams which have been transmitted through the dichroic mirror 109 of red light reflection are then incident on a dichroic mirror 115 of green light reflection. Here, only the green light component is reflected, and the remaining blue light component is transmitted. In the green light and the blue light which have been separated, similarly to the previously described red light, only rays of S-polarized light are respectively reflected by a PBS 116 for green and a PBS 118 for blue, and are respectively incident on a reflection type TN liquid crystal panel 117 for green light and a reflection type TN liquid crystal panel 119 for blue light.

The light beams reflected in the state where the polarization state has been modulated by the green light reflection type TN liquid crystal panel 117 and the blue light reflection type TN liquid crystal panel 119 are incident on dielectric films 116a, 118a of the green PBS 116 and the blue PBS 118 for a second time, at which the light beams are detected so that only P-polarized light is transmitted therethrough so that polarization modulation is converted into luminance modulation. Outgoing light beams of green and blue which have been converted into the luminance modulation are respectively incident on the cross dichroic prism 114.

Red light, green light and blue light which have been incident on the cross dichroic prism 114 are synthesized at this cross dichroic prism 114, and rays of synthesized light are incident on a projection optical system 120. This projection optical system 120 forms an image of the light beams which have been incident onto a screen 121. On the screen 121, a predetermined image is displayed.

As an illumination apparatus for reflection type spatial light modulation element, there is, e.g., illumination apparatus described in the Japanese Patent Application Laid Open No.1998-48423 publication. The illumination apparatus described in this publication is directed to a hologram color filter in which two transmission type hologram optical elements are laminated so that waveform dispersion of the hologram is utilized.

As shown in FIG. 2, this hologram color filter is caused to be of the configuration in which two holograms 102, 103 having wavelength dependencies of diffraction efficiency different from each other with respect to illumination light 101 having a predetermined incident angle θ are laminated. In this hologram color filter, a bright color filter having less wavelength dependency of diffraction efficiency and such that color balance of three colors of R (Red), G(Green) and B(Blue) has been corrected can be provided.

The wavelength dependency of diffraction efficiency of two holograms 102, 103 in this hologram color filter is set so that spatial wavelength distributions by wavelength dispersion do not coincide as shown in FIG. 3. For this reason, red light which has been diffracted at the hologram 102 of the incident side illuminates red pixel 104 in the state where it is not diffracted by the hologram 103 of the outgoing side, and blue light and green light which are not diffracted at the hologram 102 of the incident side are diffracted and are optically separated by the outgoing side hologram 103, and are respectively converged onto corresponding color pixels 105, 106.

Further, as an illumination apparatus for a reflection type spatial light modulation element, an illumination apparatus using laminated hologram color filters 124r, 124g, 124b are proposed in, e.g., the Japanese Patent Application Laid Open No.1997-189809 publication as shown in FIG. 4.

In this illumination apparatus, read-out light which is radiated (emitted) from illumination light source (not shown) is incident on hologram color filters 124r, 124g, 124b via a coupling prism 126 and a glass base (substrate) 125. These hologram color filters 124r, 124g, 124b are respectively volumetric hologram lenses for red, green and blue. Interference fringes are baked in advance at these hologram color filters 124r, 124g, 124b by laser exposure.

These color filters have a function in which respective micro-lenses for color light having areas corresponding to sizes of substantially one pixel (set consisting of three pixels in total of respective color pixels of R, G, B) are laminated.

These hologram color filters 124r, 124g, 124b allow a red light component, a green light component and a blue light component of the spectrum of read-out light $R_L$ to be transmitted through a cover glass 123, a common electrode 134, an orientation film 133, a liquid crystal layer 132, an orientation film 131 and a dielectric mirror film 130 of the reflection type liquid crystal panel to respectively converge them onto corresponding color pixel electrodes 129r, 129g, 129b on a pixel electrode layer 129.

This hologram lens has dependency with respect to polarization characteristic of incident light. Namely, among rays of incident light onto the hologram lens, an S-polarized light component is mainly diffracted, and diffraction efficiency of a P-polarized light component is lower than that.

By rigorous solution of the Coupled-wave theory (reference thesis: M. G. Moharam and T. K. Gayload: Rigorous Coupled-wave analysis of planar grating diffraction, J. Opt. Soc. Am. 71, 811–818 (1977), M. G. Moharam and T. K. Gayload: Rigorous Coupled-wave analysis of grating diffraction E-mode polarization and losses, J. Opt. Soc. Am. 73, 451–455 (1983)), it is indicated that, e.g., in the case where the corresponding hologram is a thick hologram of the reflection type and the value (t/Λ) determined by thickness t of hologram and pitch Λ of interference fringe within the hologram falls within the range from 1 to 5, a difference takes place between the diffraction efficiency of TE (S-polarized light) and that of the TM (P-polarized light), and diffraction efficiency of S-polarized light is greater by about 45% at the maximum as compared to diffraction efficiency of P-polarized light.

By this phenomenon, in this illumination apparatus, light of the S-polarized light component of rays of read-out light $R_L$ which have been obliquely incident on the hologram color filters 124r, 124g, 124b is mainly diffracted. Further, since light (P-polarized light component) $P_L$ reflected in the state where the polarization direction has been modulated by 90° of rays of illumination light which have been caused to be incident substantially perpendicular to the liquid crystal panel 122 has low diffraction effect, most rays of light are emitted vertically from the hologram color filters 124r, 124g, 124b without undergoing diffracting action by the hologram color filters 124r, 124g, 124b.

As a typical example of the incident polarization characteristic of diffraction efficiency of the transmission type volumetric hologram, in the case where the refractive index modulation degree is 0.04, the thickness is 3 μm, the incident angle within hologram medium is 60°, the outgoing angle is 0°, and the manufacturing wavelength and reproduction wavelength are both 532 nm, diffraction efficiency of S-polarized light $S_P$ is 70%, whereas diffraction efficiency of P-polarized light $P_P$ is 25% as shown in FIG. 5. As a result, dependency of diffraction efficiency by incident polarized light appears.

As shown in FIG. 6, in order to increase superficial aperture percentage of the transmission type liquid crystal image display element to improve transmission percentage, a transmission type liquid crystal image display element using a micro lens array 137 of the refraction type is proposed.

In this transmission type liquid crystal image display element, an illumination light which has been incident on an incident side polarization plate 135 and has been changed into linear polarized light by the incident side polarization plate 135 is incident from an incident side glass base (substrate) 136, and is transmitted through a liquid crystal layer 138 and is converged onto pixel opening portions 139 of TFT by the micro lens array 137. The polarization state of this incident light is modulated at the pixel opening portions 139. The incident light thus modulated is emitted from an outgoing side glass base (substrate) 140. This illumination light is then transmitted through an outgoing side polarization plate 141, and modulation of the polarization state is converted into luminance modulation at this outgoing side polarization plate 141.

In the transmission type hologram as described above, since diffraction acceptance angle of incident light is narrow, and the diffraction acceptance angle and the outgoing angle are not sufficiently separated, light utilization efficiency is low.

In the image display device using the above-described transmission type hologram as a color filter, since color separation is conducted by making use of wavelength dispersion of the hologram, there is no degree of freedom at the separation angle setting of respective rays of color light. As a result, it is impossible to optimally set the distance between the color filter and color pixels of spatial light modulation element from viewpoints of manufacturing difficulty and/or light utilization efficiency.

In the image display apparatus using such an image display device, in the case where it is the premise that spatial light modulation element of the same pixel pitch is employed, separation angles of respective rays of color light cannot be large. Accordingly, it is impossible to set the distance between the color filter and color pixels of the spatial light modulation element to a short distance, e.g., 50 μm or less. Namely, in this image display apparatus, it is impossible to realize improvement in light utilization efficiency by a broad angle of view and/or a broad-band of illumination light with respect to the color filter. As a result, a bright image cannot be obtained.

DISCLOSURE OF THE INVENTION

An object of the present invention is to provide a novel transmission type laminated hologram optical element and a novel image display apparatus using such an optical element which can solve the problems that conventional image display apparatuses have.

Another object of the present invention is to provide a transmission type laminated hologram optical element in which diffraction acceptance angle of incident light is widened so that light utilization efficiency is caused to be high to have the ability to optimally set the distance with respect to the color pixels of spatial light modulation element from viewpoints of manufacturing difficulty and/or light utilization efficiency.

A further object of the present invention is to provide an image display device and an image display apparatus in which a transmission type laminated hologram element which can attain the above-described objects is used to thereby have the ability to display a bright image.

A transmission type laminated hologram optical element according to the present invention which is proposed in order to attain the above-described objects is directed to a transmission type laminated hologram optical element caused to be of the configuration in which plural transmission type hologram optical elements having diffraction acceptance incident angles different from each other are laminated, wherein the respective transmission type hologram optical elements are adapted so that outgoing angles with respect to center incident angles of respective diffraction acceptance incident angles at an arbitrary wavelength of the visible region are different from each other.

An image display device according to the present invention comprises a transmission type laminated hologram optical element, and a spatial light modulation element for modulating outgoing light from the transmission type laminated hologram optical element, wherein the transmission type laminated hologram optical element is caused to be of the configuration in which there are laminated plural transmission type hologram optical elements in which diffraction acceptance incident angles are different from each other, and outgoing angles with respect to center incident angles of respective diffraction acceptance incident angles at an arbitrary wavelength of the visible region are different from each other.

An image display apparatus according to the present invention comprises an illumination light source for emitting illumination light, a transmission type laminated hologram optical element for diffracting incident light, an illumination optical system for guiding the illumination light to the transmission type laminated hologram optical element as incident light, a spatial light modulation element for modulating the illumination light which has been emitted from the transmission type laminated optical element, and a magnification optical system for magnifying the illumination light which has been modulated by the spatial light modulation element to form an image thereof, wherein the transmission type laminated hologram optical element is adapted so that plural transmission type hologram optical elements in which diffraction acceptance incident angles are different from each other, and outgoing angles with respect to center incident angles of respective diffraction acceptance incident angles at an arbitrary wavelength of the visible region are different from each other are laminated.

Another image display apparatus according to the present invention comprises an illumination light source for emitting illumination light, a transmission type polarization selective hologram optical element having the structure in that two regions where incident polarization azimuth dependencies of refractive index are different from each other are arranged in order, and caused to be of the configuration in which plural transmission type hologram optical elements having diffraction acceptance incident angles different from each other are laminated to diffract incident light, an illumination optical system for guiding illumination light to allow the illumination light to be incident at an incident angle from more than 30° to less than 90° with respect to the normal of illumination light receiving surface of the transmission type polarization selective hologram optical element with respect to the transmission type polarization selective hologram optical element, a reflection type spatial light modulation element for modulating polarization state of illumination light which has been diffracted by the transmission type polarization selective hologram optical element, and a magnification optical system for magnifying a display image which has been modulated by the reflection type spatial light modulation element. The respective transmission type hologram optical elements constituting the transmission type polarization selective hologram optical element are adapted so that outgoing angles with respect to center incident angles of respective diffraction acceptance incident angles at an arbitrary wavelength of the visible region are different from each other, and adapted to diffract the P-polarized light component or the S-polarized light component of received illumination light mainly toward the reflection type spatial light modulation element and adapted so that diffraction efficiency with respect to the polarization component perpendicular to the polarization component mainly diffracted at the first incidence of rays of illumination light which are re-incident after undergone phase modulation by the reflection type spatial light modulation element is caused to be 10% or less to thereby allow 70% of the polarization component thereof or more to be transmitted.

Still, further objects of the present invention and practical merits obtained by the present invention will become more apparent from the description of the embodiments which will be given below with reference to the attached drawings.

BRIEF DESCRIPTION OF THE DRAWINGS

FIG. 5 is a graph showing wavelength dependency of diffraction efficiency of the transmission type volumetric hologram used in the conventional image display element.

FIG. 6 is a longitudinal cross sectional view showing a conventional image display device using a micro-lens array.

BEST MODE FOR CARRYING OUT THE INVENTION

Embodiments of the present invention will now be described in detail with reference to the attached drawings.

[1] Polarization selective hologram optical element

Figure 1:
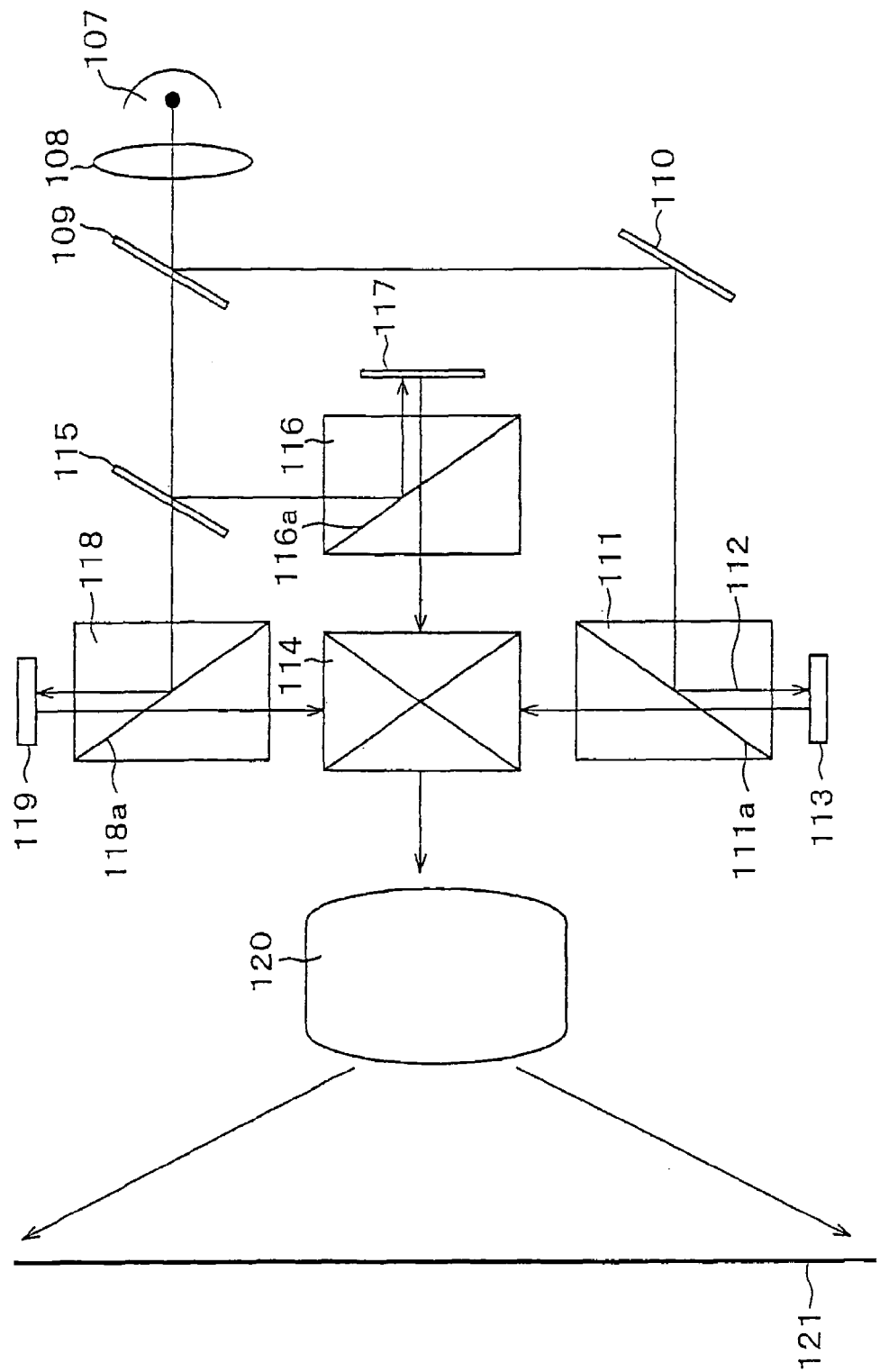
FIG. 1 is a plan view showing an example of a conventional image display apparatus.
Figure 2:
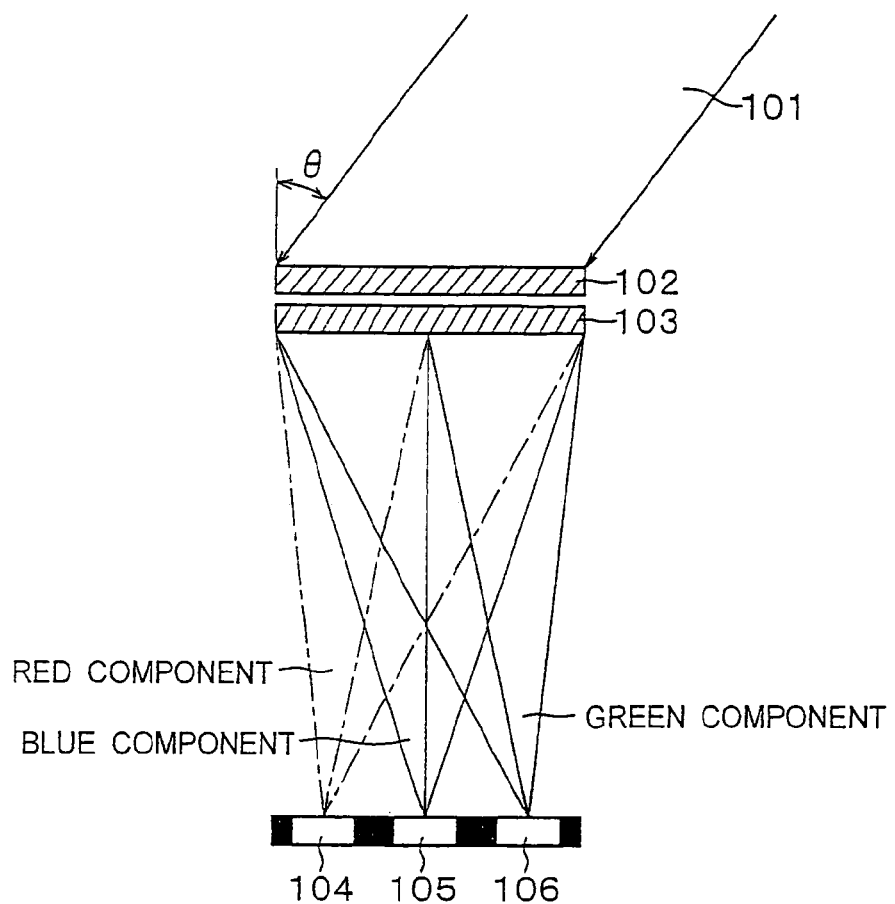
FIG. 2 is a longitudinal cross sectional view showing another example of a conventional image display device.
Figure 3:
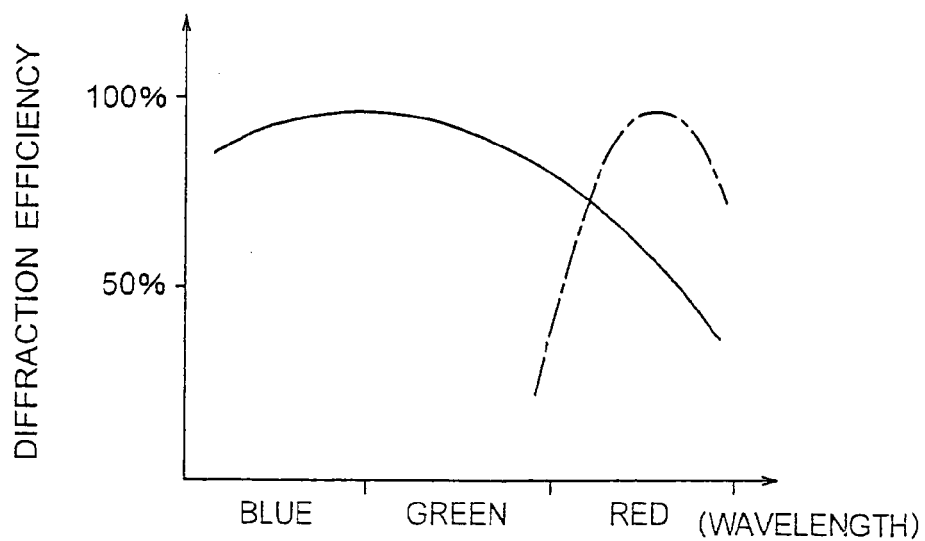
FIG. 3 is a graph showing wavelength dependency of diffraction efficiency of a hologram optical element used in the conventional image display device.
Figure 4:
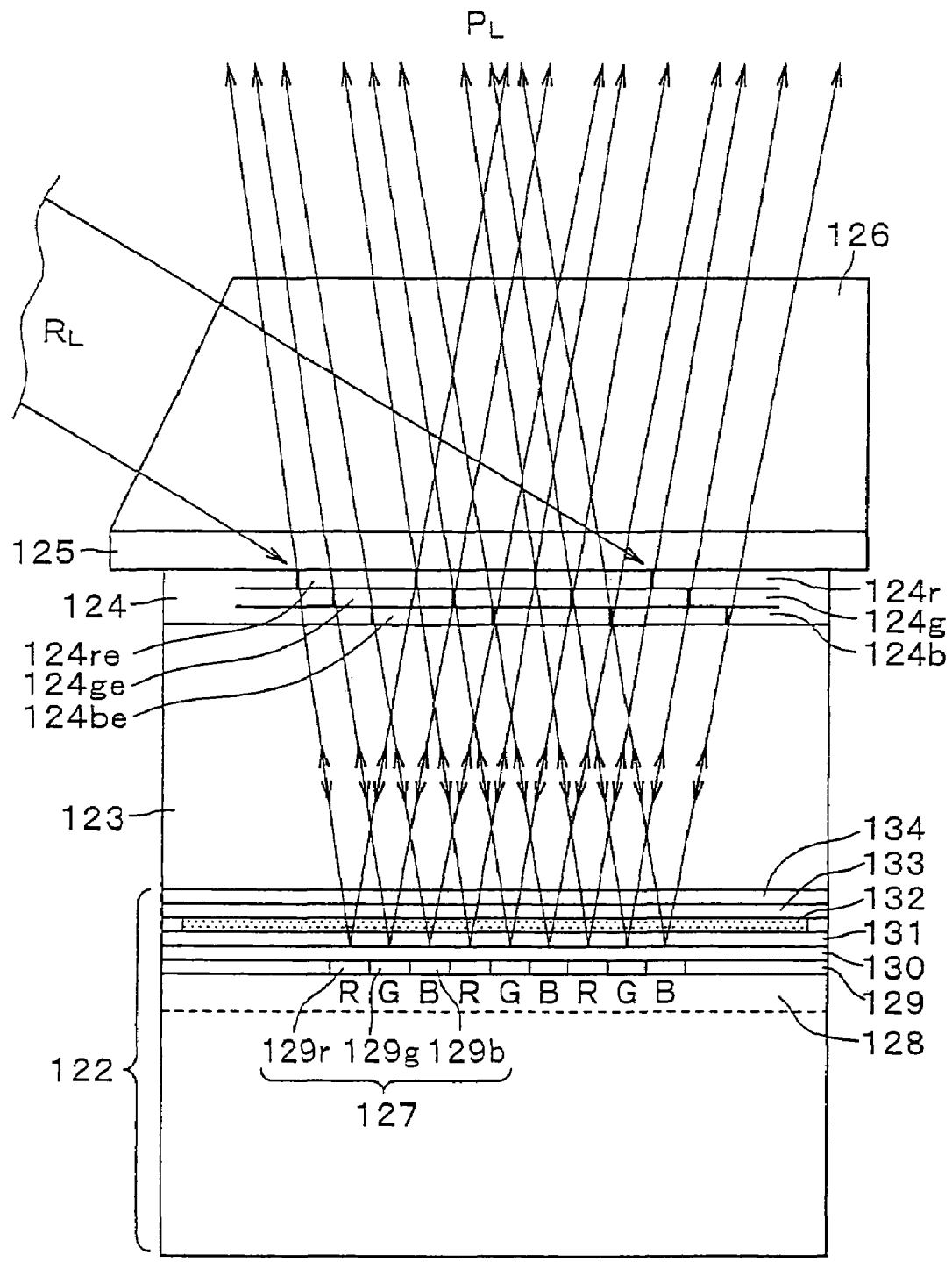
FIG. 4 is a longitudinal cross sectional view showing a further example of the conventional image display device.
Figure 7:
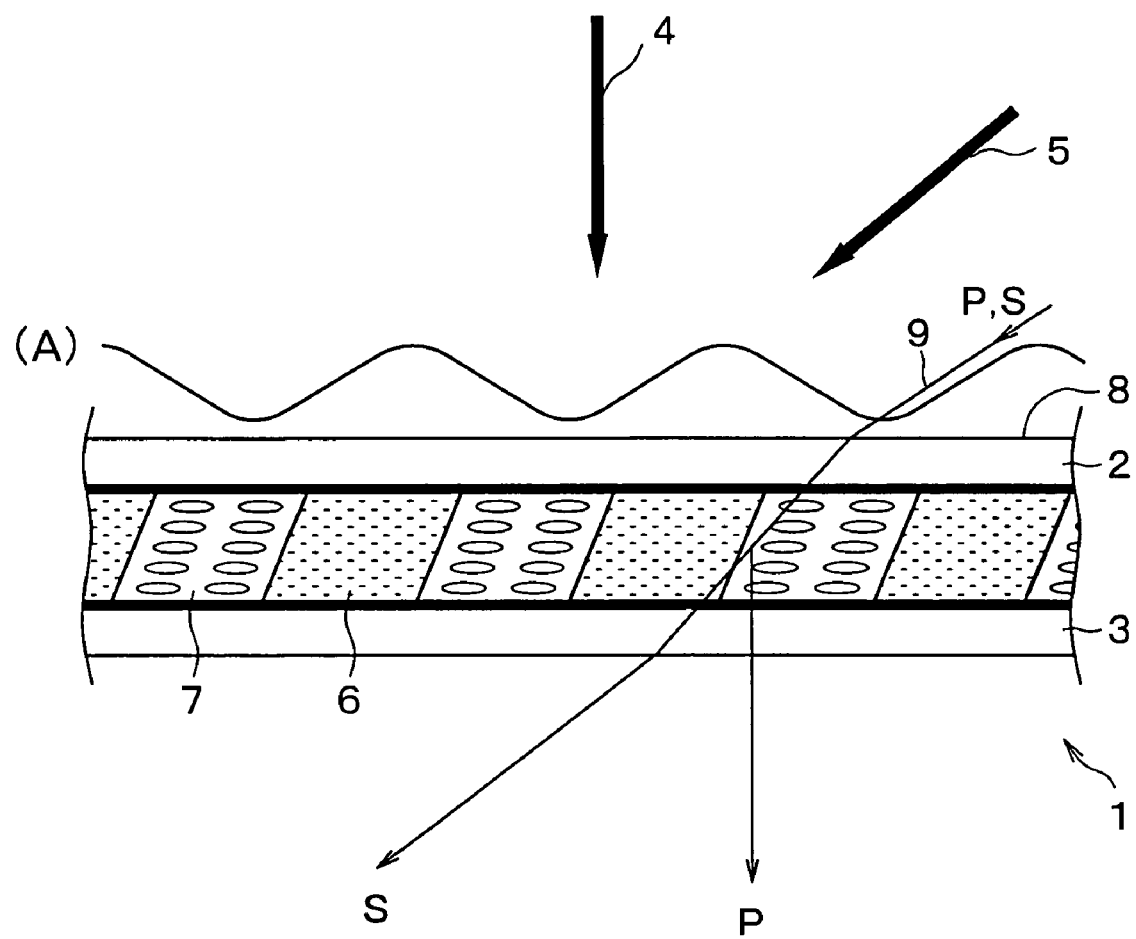
FIG. 7 is a longitudinal cross sectional view showing the configuration of a transmission type polarization selective hologram optical element constituting a transmission type laminated hologram optical element according to the present invention.

First, the structure of a transmission type polarization selective hologram optical element (hereinafter referred to as holographic PDLC) used in the present invention and the manufacturing process thereof will be explained with reference to FIG. 7.

In order to manufacture the holographic PDLC used in the present invention, PDLC in which polymer before photopolymerization takes place (hereinafter referred to as prepolymer), nematic liquid crystal, starting agent and coloring matter, etc. are mixed and put between glass bases (substrates) 2 and 3. At this time, weight percentage of the nematic liquid crystal is set to about 40% of the entirety. As the layer thickness (hereinafter refereed to as cell gap) of PDLC, an optimum value is selected in correspondence with the specification of the polarization selective hologram optical element within the range from 3 µm to 15 µm.

Then, in order to record interference fringes onto the holographic PDLC panel 1, object light 4 and reference light 5 from a laser light source (not shown) are irradiated onto the holographic PDLC panel 1 to generate the intensity (A) of light by interference. At this time, at the place where interference fringe is bright, i.e., at the place where the energy of a photon is great, prepolymers within PDLC are photopolymerized by that energy so that they are changed into a polymer. For this reason, prepolymers are delivered one after another from the peripheral portion. As a result, the polymerized region is divided into the region where polymerized prepolymers are thick and the region where those prepolymers are thin. The region where prepolymers are thin has a high density of nematic liquid crystal. In this way, two regions of polymer high density regions 6 and liquid crystal high density regions 7 are formed. In the case of this embodiment, since object light 4 and reference light 5 are irradiated from the same side to the holographic PDLC panel 1, manufactured holographic PDLC panel 1 is caused to be of the transmission type.

The polymer high density region 6 of the holographic PDLC panel 1 manufactured in this way is isotropic in regard to the refractive index, and its value is caused to be, e.g., 1.5. On the other hand, within the liquid crystal high density region 7, nematic liquid crystal molecules are arranged in the state where the major axis direction is substantially perpendicular to the boundary surface between the liquid crystal high density region 7 and the polymer high density region 6. For this region, within the liquid crystal high density region 7, the refractive index has incident polarization azimuth dependency. In this case, the ordinary ray is an S-polarized light component in the case where reproduction light 9 incident on light incident surface 8 of the holographic PDLC panel 1 is considered.

If the ordinary ray refractive index nlo of this liquid crystal high density region 7 is caused to be substantially equal to the refractive index np of the polymer high density region 6, e.g., refractive index difference is set to 0.01 or less, modulation of the refractive index with respect to the incident S-polarized light component is extremely small so that the diffraction phenomenon hardly takes place. In general, difference Δn between ordinary ray refractive index nlo and extraordinary ray refractive index nle of the nematic liquid crystal is about 0.1 to 0.2. For this reason, with respect to the P-polarized light component of reproduction light 9 in which incident direction is equal, there is a refractive index difference between the polymer high density region 6 and the liquid crystal high density region 7. This holographic PDLC panel 1 functions as a phase modulation type hologram to produce a diffraction effect.

This is the operating principle of the transmission type polarization selective hologram optical element using holographic PDLC.

Figure 8:
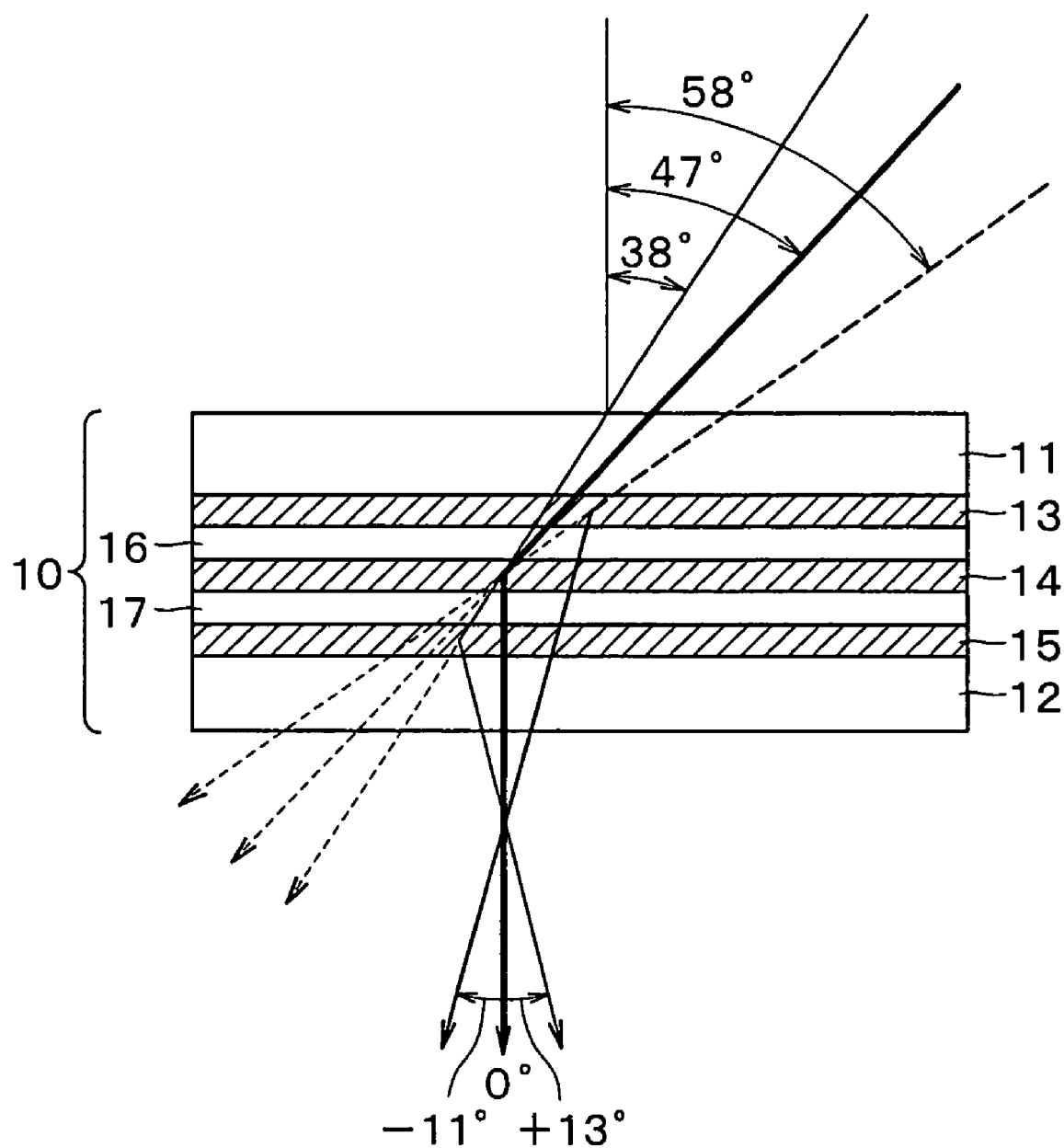
FIG. 8 is a longitudinal cross sectional view showing a first embodiment of the transmission type laminated hologram optical element according to the present invention.

[2] Transmission type laminated hologram optical element according to the present invention As shown in FIG. 8, the transmission type laminated hologram optical element according to the present invention has the structure in which first to third transmission type polarization selective holograms 13, 14, 15 are laminated therebetween as three layers through barrier layers 16, 17 between these glass bases (substrates) 11, 12 in the state where both sides thereof are put between the glass bases (substrates) 11, 12.

Figure 9:
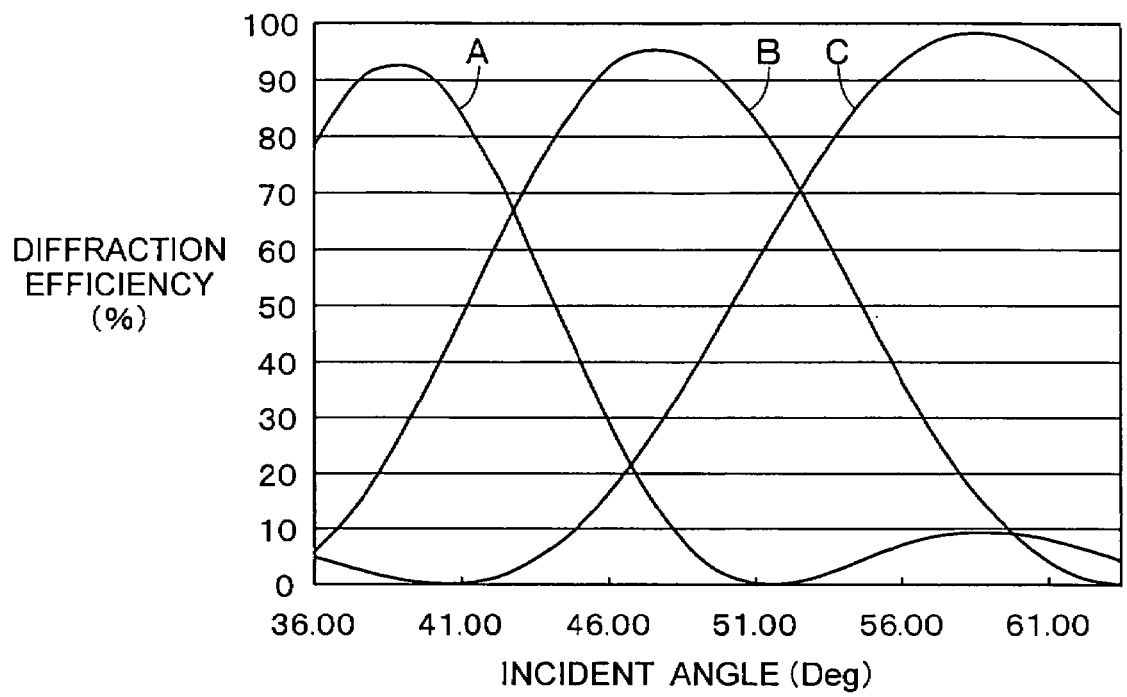
FIG. 9 is a graph showing the incident angle dependency of diffraction efficiencies of respective transmission type polarization selective holograms constituting the transmission type laminated hologram optical element.

Incident angle dependency of diffraction efficiency in the case where reproduction wavelengths (λ play) of the respective transmission type polarization selective holograms 13, 14, 15 are assumed to be 532 nm is shown in FIG. 9. Here, as the specification common to all transmission type polarization selective holograms 13, 14, 15, thickness (t) of the hologram layer is 5 µm, refractive index modulation degree (Δn) is 0.05, and exposure wavelength (λrec) is 532 nm.

Incident angles of object light and reference light at the time of exposure are respectively different for every respective transmission type polarization selective holograms 13, 14, 15. Specifically, with respect to the first polarization selective hologram 13 of the incident side, reference light incident angle is 38° and object light incident angle is −11. With respect to the intermediate second polarization selective hologram 14, reference light incident angle is 47° and object light incident angle is 0°. With respect to the third polarization hologram 15 of the outgoing side, reference light incident angle is 58° and object light incident angle is 13°.

Accordingly, at respective polarization selective holograms 13, 14, 15, center values of diffraction acceptance angles which satisfy the Bragg condition are different by about 10°, and center values of outgoing angles of rays of outgoing light from these three holograms are also different by about 12°.

Figure 10:
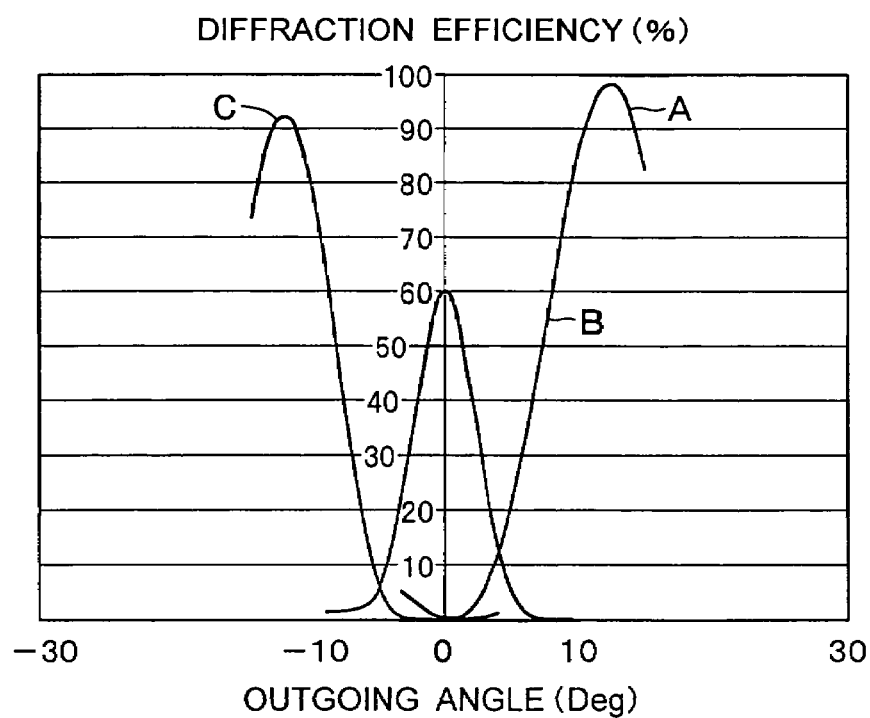
FIG. 10 is a graph showing outgoing angle dependencies of diffraction efficiencies of respective transmission type polarization selective holograms constituting the transmission type laminated hologram optical element.

For this reason, the transmission type laminated hologram optical element 10 shown in FIG. 8 has a wide diffraction acceptance angle. Outgoing angle ranges of diffraction efficiencies of respective rays of diffracted light A, B, C from the respective polarization selective holograms 13, 14, 15 at this time are small as compared to the diffraction acceptance angle range as shown in FIG. 10. Namely, as apparent when comparison between FIGS. 9 and 10 is made, outgoing angle ranges of the respective polarization selective holograms 13, 14, 15 are small as compared to the diffraction acceptance angle range.

This is because incident angle with respect to the transmission type laminated hologram optical element 10 according to the present invention is small as compared to outgoing angle. Thus, a transmission type laminated hologram optical element having the feature that diffraction acceptance angle is large, but outgoing angle after diffraction is small was realized. Accordingly, it becomes possible to suppress re-diffraction by the second and third polarization selective holograms 14, 15 of rays of outgoing light of the first and second polarization selective holograms 13, 14 without excessively increasing the angle of view of outgoing light as compared to incident angle of view.

[3] Image display device according to the present invention

Now, the reflection type display device according to the present invention using the above-described holographic PDLC (polarization selective hologram optical element) will be explained with reference to FIG. 11.

Figure 11:
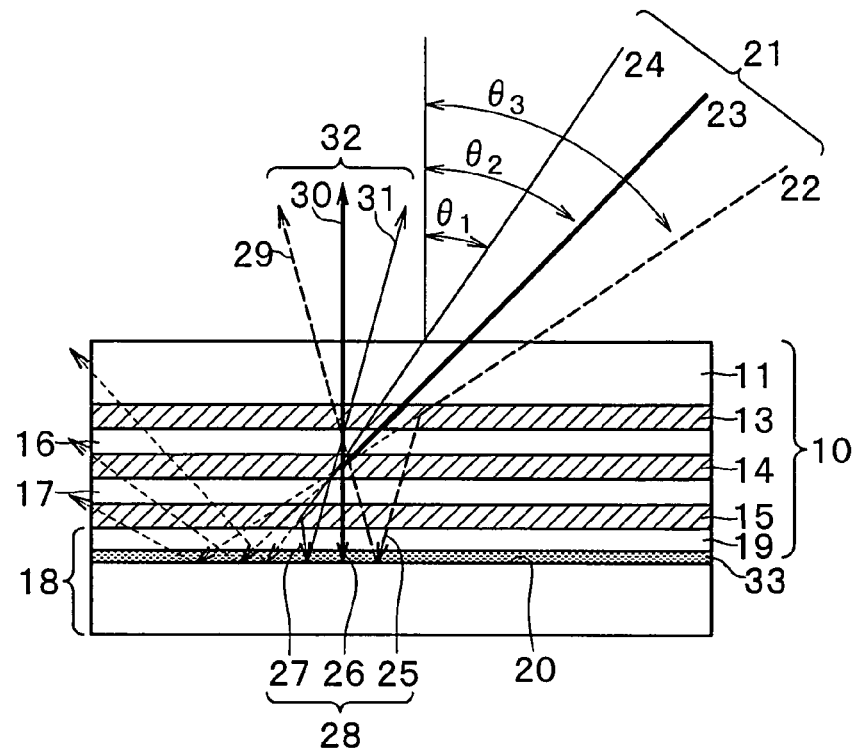
FIG. 11 is a longitudinal cross sectional view showing the configuration of a first embodiment of an image display device according to the present invention.

As shown in FIG. 11, this image display device is caused to be of the configuration in which the above-described holographic PDLC 10 is optically tightly in contact with a reflection type perpendicular orientation liquid crystal element 18 through a glass base (substrate) 19 having thickness of about 50 μm. The holographic PDLC 10 in this embodiment corresponds to the transmission type laminated hologram optical element shown in FIG. 8.

In this image display device, rays of incident light 21 consisting of three rays of incident light 22, 23, 24 including both a P-polarized light component and an S-polarized light component are incident from the glass base (substrate) 11 of the holographic PDLC 10 at incident angles $\theta_1 \pm \alpha$, $\theta_2 \pm \beta$, $\theta_3 \pm \gamma$. Here, $\alpha, \beta, \gamma$ represent diffusion angles of three rays of incident light 22, 23, 24.

The incident light is first incident on the first transmission type polarization selective hologram 13. Here, only P-polarized light of the incident angle $\theta_3 \pm \gamma$ within the diffraction acceptance angle of the first transmission type polarization selective hologram 13 is diffracted so that diffracted light 25 is provided. This diffracted light 25 proceeds in the direction of incident angle $\theta_3 \pm \gamma'$ with respect to reflection surface 20 of the reflection type perpendicular orientation liquid crystal element 18.

At this time, as previously described, $\gamma > \gamma'$ is satisfied. Since this diffracted light 25 has diffraction acceptance angle different from that of the second transmission type polarization selective hologram 14 or the third transmission type polarization selective hologram 15, it reaches the reflection surface 20 via the liquid crystal layer 33 of the reflection type perpendicular orientation liquid crystal element 18 without being diffracted for a second time on the way.

For a time period during which this diffracted light 25 reciprocates the liquid crystal layer 33, the phase state thereof is controlled. When a white display is conducted, polarization direction is rotated by 90°. When a black display is conducted, polarization state at the time of incidence is maintained. The modulated light which has been modulated and reflected by the liquid crystal layer 33 and the reflection surface 20 in this way is re-incident on respective transmission type polarization selective holograms 13, 14, 15.

When the modulated light is re-incident on the respective transmission type polarization selective holograms 13, 14, 15, the component which is the P-polarized light and falls within the diffraction acceptance angle range of the respective transmission type polarization selective holograms 13, 14, 15 is diffracted for a second time and returns to the opposite direction of rays of incident light 22, 23, 24. Further, the remaining component which is not diffracted of rays of the P-polarized light of modulated light and S-polarized light component are emitted as outgoing light 29 from the holographic PDLC 10 without being diffracted at the transmission type polarization selective holograms 13, 14, 15.

Also with respect to rays of incident light 23, 24, similarly to the above deviations $\alpha', \beta'$ of outgoing angle are smaller than incident angle deviations $\alpha, \beta$.

Namely, at the second transmission type polarization selective hologram 14, only P-polarized light of incident angle $\theta_2 \pm \beta$ within the diffraction acceptance angle of the second transmission type polarization selective hologram 14 among rays of incident light is diffracted so that diffracted light 26 is provided. This diffracted light 26 proceeds in the direction of incident angle $\theta_2 \pm \beta'$ with respect to the reflection surface 20 of the reflection type perpendicular orientation liquid crystal element 18. Here, $\beta > \beta'$ is satisfied. Since this diffracted light 26 has diffraction acceptance angle different from that of the third transmission type polarization selective hologram 15, it reaches the reflection surface 20 via the liquid crystal layer 33 of the reflection type perpendicular orientation liquid crystal element 18 without being diffracted for a second time on the way. Modulated light obtained as the result of the fact that this diffracted light 26 has been modulated and reflected by the liquid crystal layer 33 and the reflection surface 20 is re-incident on respective transmission type polarization selective holograms 13, 14, 15.

The component which is P-polarized light and falls within the diffraction acceptance angle range of the respective transmission type polarization selective holograms 13, 14, 15 among rays of this modulated light is diffracted for a second time, and returns to the opposite direction of rays of incident light 22, 23, 24. The remaining component which is not diffracted of P-polarized light of modulated light and S-polarized light component are emitted as outgoing light 30 from the holographic PDLC 10 without being diffracted at the transmission type polarization selective holograms 13, 14, 15.

At the third transmission type polarization selective hologram 15, only P-polarized light of incident angle $\theta_1 \pm \alpha$ within the diffraction acceptance angle of the third transmission type polarization selective hologram 15 among rays of incident light is diffracted so that diffracted light 27 is provided. This diffracted light 27 proceeds in the direction of incident angle $\theta_1 \pm \alpha'$ with respect to the reflection surface 20 of the reflection type perpendicular orientation liquid crystal element 18. Here, $\alpha > \alpha'$ is satisfied. This diffracted light 27 reaches the reflection surface 20 via the liquid crystal layer 33 of the reflection type perpendicular orientation liquid crystal element 18. The modulated light obtained as the result of the fact that this diffracted light 27 has been modulated and reflected by the liquid crystal layer 33 and the reflection surface 20 is re-incident on the respective transmission type polarization selective holograms 13, 14, 15.

The component which is P-polarized light and falls within the diffraction acceptance angle range of the respective transmission type polarization selective holograms 13, 14, 15 among rays of this modulated light is diffracted for a second time, and returns to the opposite direction of rays of incident light 22, 23, 24. The remaining component which is not diffracted among rays of P-polarized light of modulated light and S-polarized light component are emitted as an outgoing light 31 from the holographic PDLC10 without being diffracted at the transmission type polarization selective holograms 13, 14, 15.

Figure 12:
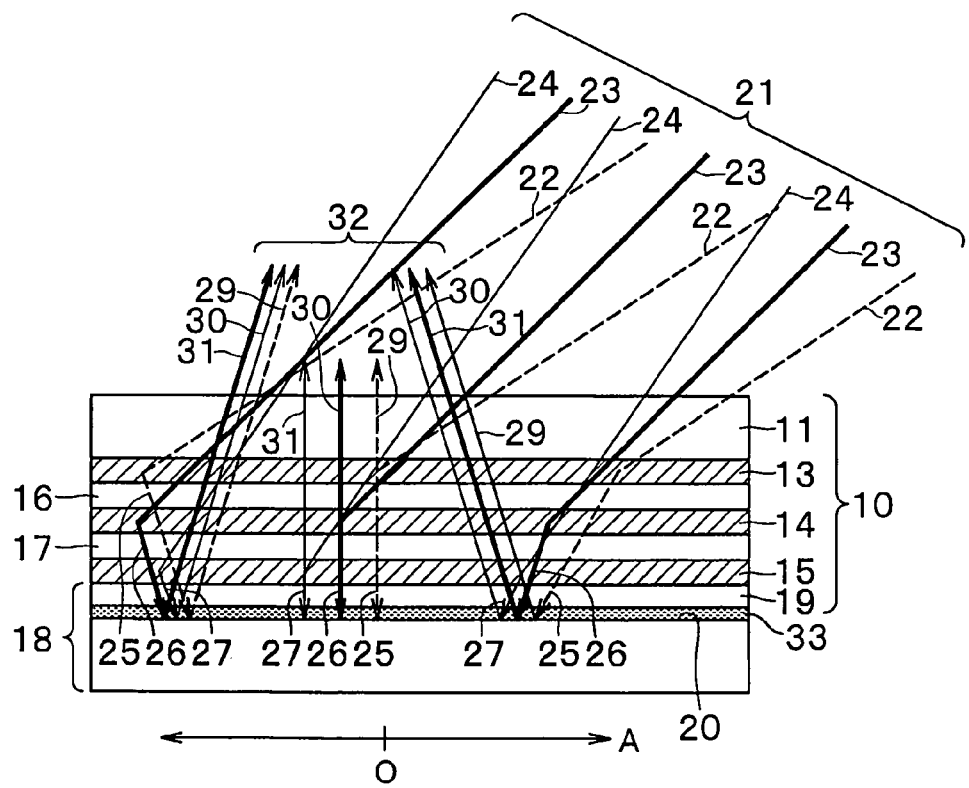
FIG. 12 is a longitudinal cross sectional view showing the configuration in which a converging function is added to the transmission type polarization selective hologram in the image display device.

It is to be noted that the holographic PDLC10 shown here has converging function, and serves to converge incident light 21 toward the reflection surface 20 of the reflection type perpendicular orientation liquid crystal element 18 as shown in FIG. 12. Namely, pitches of interference fringes of respective transmission type polarization selective holograms 13, 14, 15 of the holographic PDLC10 in this case become narrow according as distance from the center 0 toward the periphery becomes short in the direction indicated by arrow A shown in FIG. 12.

In the actual image display, liquid crystal layer 33 of the reflection type perpendicular orientation liquid crystal element 18 every pixel is controlled so that polarization state of reflected light is modulated. For this reason, image display can be made by using reflected light 32 mainly having S-polarized component.

Here, explanation will be given in connection with a "thick hologram". The "thick hologram" referred to here refers to hologram where Q value indicated by the following formula is 10 or more.

$$Q = 2\pi \lambda t / (n \Lambda \Lambda)$$

Here, $\lambda$ is reproduction wavelength, t is thickness of hologram layer, n is average refractive index of the hologram layer, and $\Lambda$ is pitch of interference fringe.

Further, the relationship indicated by the following formula holds.

$$\Lambda = \lambda c / \lambda 2 \sin\{(\theta s - \theta r)/2\}|$$

Here, $\lambda c$ is manufacturing wavelength, $\theta s$ is incident angle of object light, and $\theta r$ is incident angle of reference light.

On the assumption that $\lambda c$ is 0.532 μm, $\theta s$ is 40°, $\theta r$ is 0°, $\lambda$ is 0.532 μm, t is 6 μm and n is 1.5, pitch $\Lambda$ of the interference fringe becomes equal to 0.68 μm and Q becomes equal to 28.9. Accordingly, definition of the above-described "thick hologram" is satisfied.

"Thick hologram" has the feature that diffraction efficiency is high, but diffraction efficiency is relatively suddenly lowered when the condition of reproduction light deviates from the condition such as the use wavelength and/or the incident angle of object light and reference light at the time of manufacturing, etc. Namely, when the incident angle of reproduction light greatly deviates from the incident angle which gives the peak of diffraction efficiently at a certain reproduction wavelength, it also takes place that diffraction effect does not appear. For this reason, as previously described, even if reflected light 32 is a P-polarized light component, it becomes difficult to be diffracted at respective transmission type polarization selective holograms 13, 14, 15.

In the polarization selective hologram optical element according to the present invention, in order to reduce the pitch $\Lambda$ of interference fringe with a view to attaining high diffraction efficiency, bend angle, i.e., $|(\theta s - \theta r)|$ is set to 30° or more.

Figure 13:
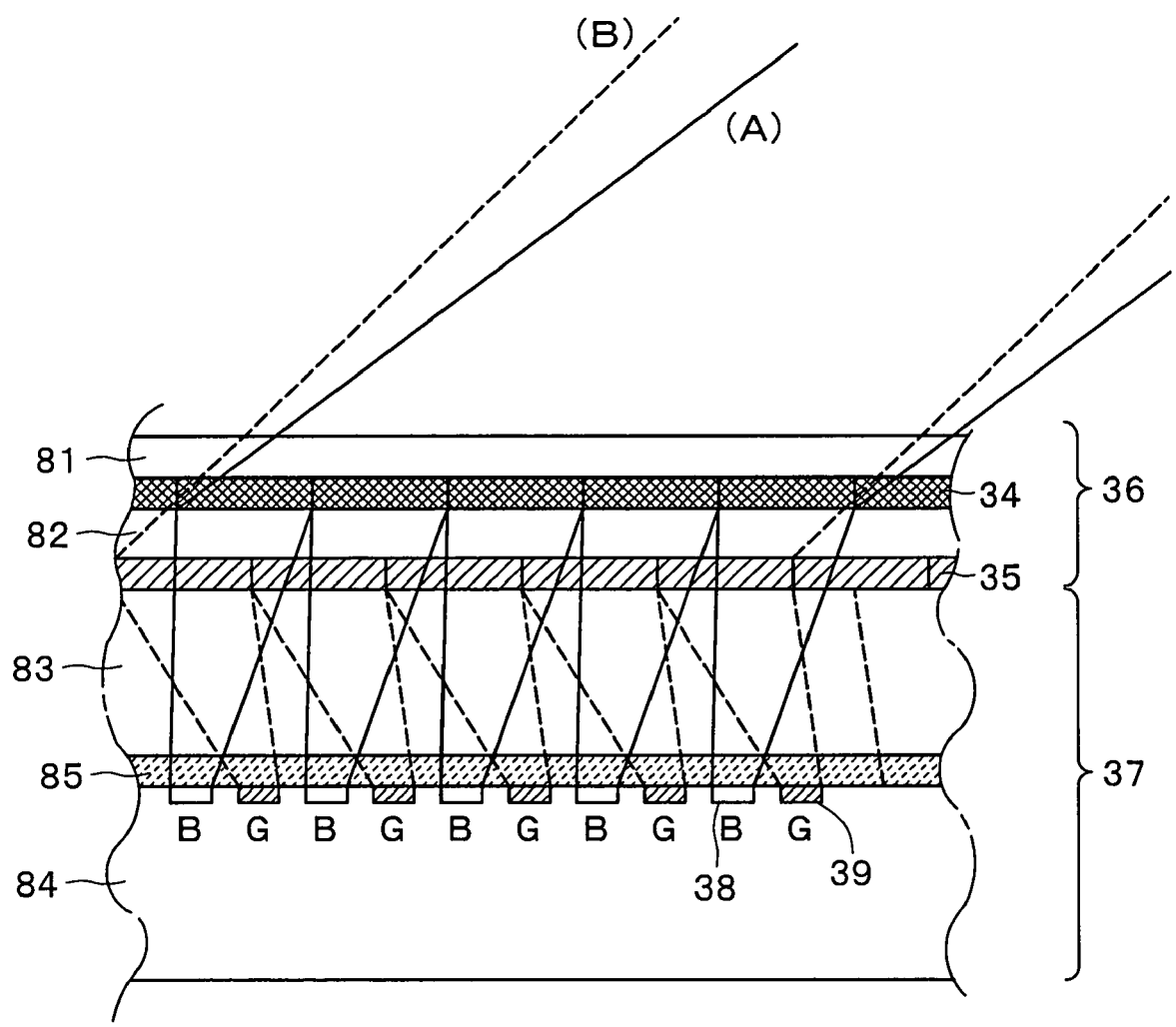
FIG. 13 is a longitudinal cross sectional view showing the configuration of a second embodiment of the image display device according to the present invention.

Now, explanation will be given with reference to FIG. 13 in connection with the second embodiment of the image display device of the reflection type according to the present invention using the previously described holographic PDLC (polarization selective hologram optical element). As shown in FIG. 13, a transmission type laminated hologram optical element 36 in this embodiment is of the laminated structure of two layers of a hologram layer 34 for blue light provided between glass bases (substrates) 81, 82, and a hologram layer 35 for green light provided between glass bases (substrates) 82, 83, and is constituted integrally with a reflection type liquid crystal element 37 for blue and green.

This image display device serves to allow blue light (A) and green light (B) to be incident at incident angles different from each other. The blue light hologram layer 34 and the green light hologram layer 35 have diffraction acceptance angles different from each other.

Blue light diffracted at the blue light hologram layer 34 is converged onto pixel electrodes 38 for blue light of the reflection type liquid crystal element 37 for blue and green by the function of a lens (cylindrical lens) having converging force with respect to only one direction of this blue light hologram layer 34.

Green light diffracted at the green light hologram layer 35 is converged onto pixel electrodes 39 for green light of the reflection type liquid crystal element 37 for blue and green by the function of a lens (cylindrical lens) having converging force with respect to only one direction of the green light hologram layer 35. The blue/green light reflection type liquid crystal element 37 is caused to be of the configuration in which a liquid crystal layer 85 is provided between glass bases (substrates) 83, 84 and color pixel electrodes 38, 39 are provided at the glass base (substrate) 84 side.

Centers as hologram lens of respective color hologram layers 34, 35 are caused to be substantially in correspondence with centers of corresponding color pixel electrodes 38, 39. Since outgoing angles from respective color hologram layers 34, 35 are not equal to each other, two rays of color light are converged in such a manner that they are crossed as shown in FIG. 13.

At the time of "white" display, rays of illumination light (A) and (B) which have been color-separated and converged with respect to respective color pixel electrodes 38, 39 are changed into S-polarized light as the result of the fact that the incident polarization direction is rotated by 90°, and are reflected. Since this reflected light has diffraction acceptance angle deviating from those of the blue light hologram layer 34 and the green light hologram layer 35, diffraction efficiency is low even if such reflected light is P-polarized light. As a result, the reflected light is emitted at angles of directions opposite to each other with respect to vertical direction of the blue/green light reflection type liquid crystal element 37 without being diffracted at these respective color light hologram layers 34, 35.

Now, the third embodiment of the image display device according to the present invention will be explained with reference to FIG. 14.

Figure 14:
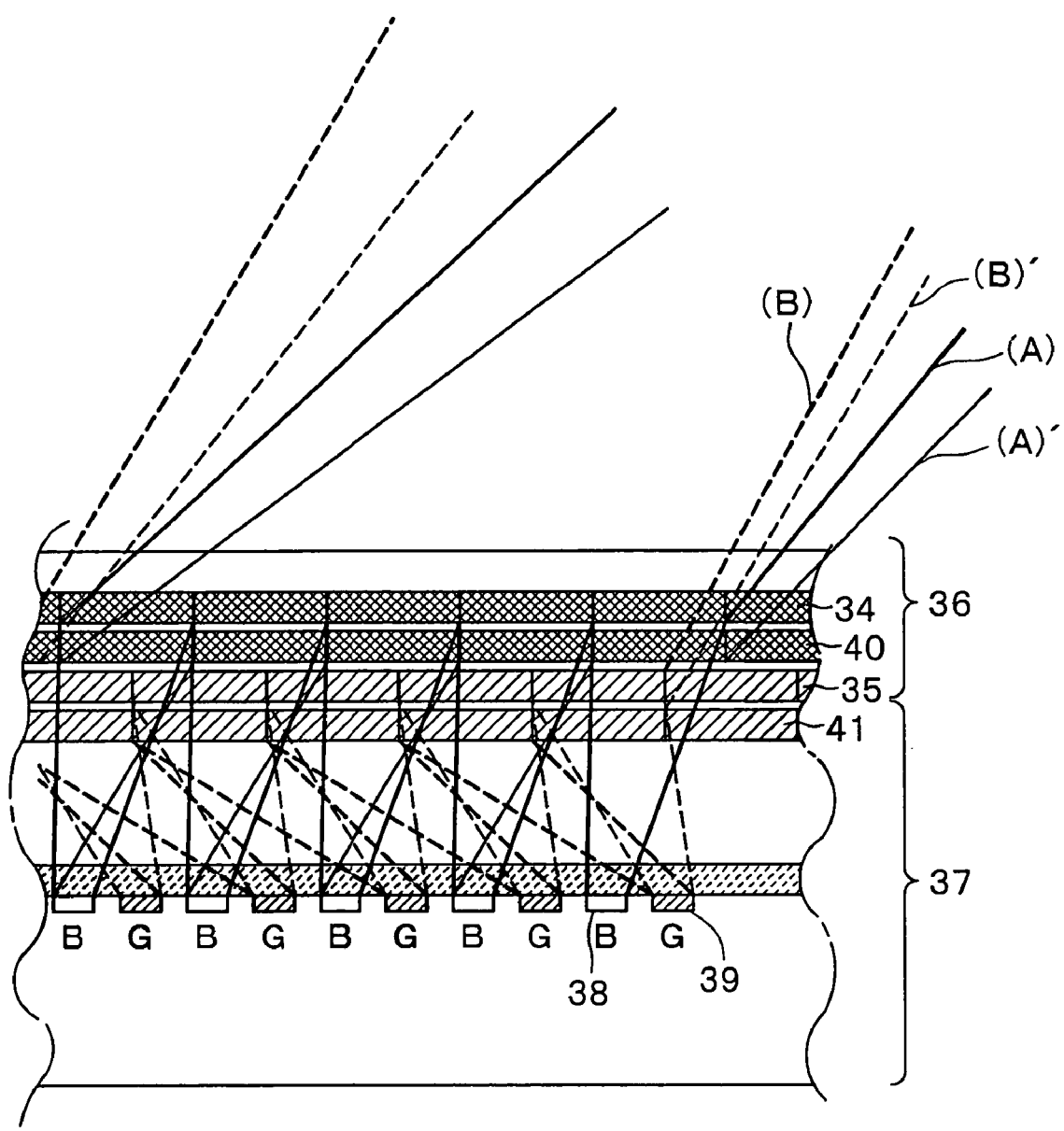
FIG. 14 is a longitudinal cross sectional view showing the configuration of a third embodiment of the image display device according to the present invention.

As shown in FIG. 14, a second blue light diffraction hologram layer 40 and a second green light diffraction hologram layer 41 having incident angle acceptance ranges different with respect to respective blue light hologram layer 34 and green light hologram layer 35 and outgoing angles corresponding thereto which are different from each other are supplemented (added) to thereby broaden the acceptance range of incident angle as indicated by rays of illumination light (A) to (A)' and (B) to (B)' to have ability to improve light utilization efficiency.

Figure 15:
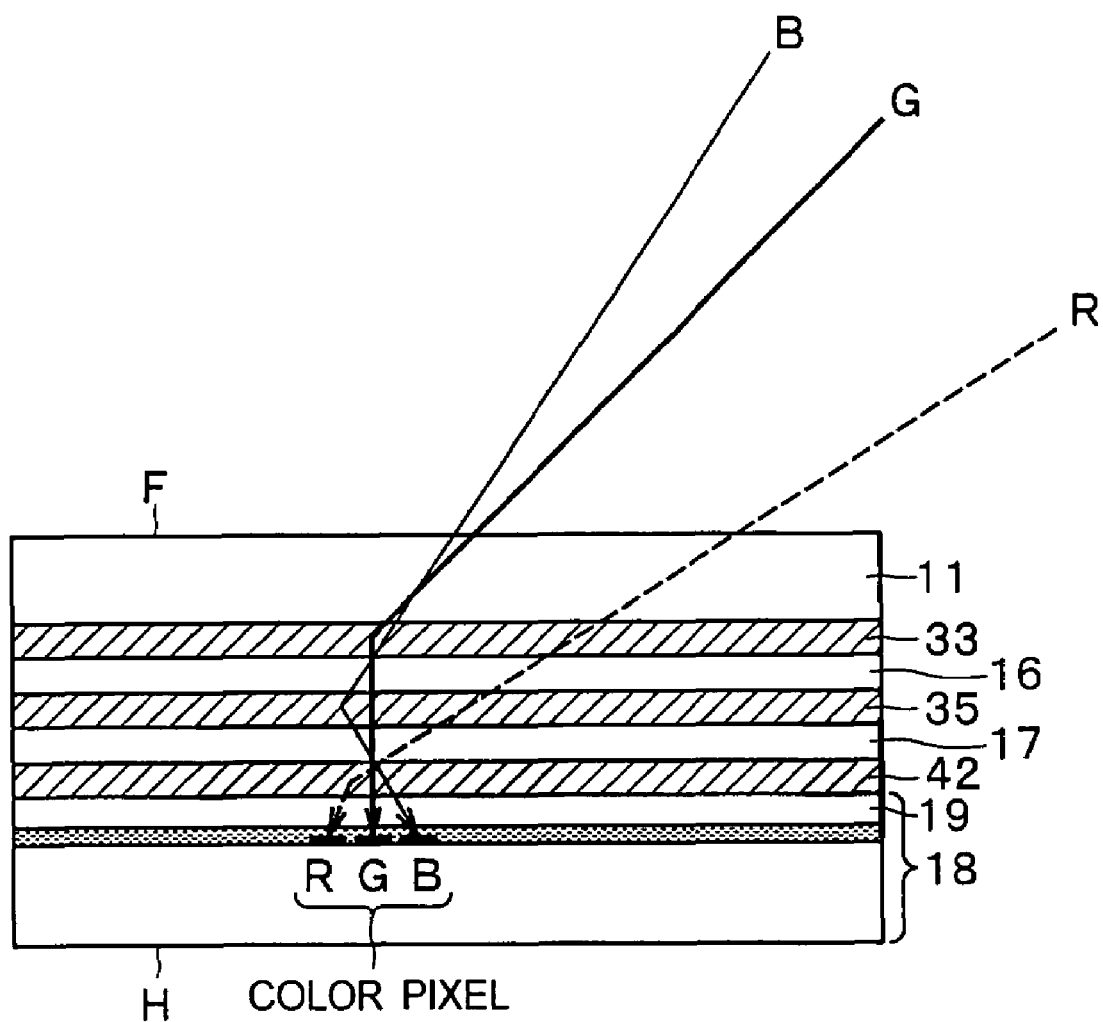
FIG. 15 is a longitudinal cross sectional view showing the configuration of a fourth embodiment of the image display device according to the present invention.

The fourth embodiment of the image display device according to the present invention is shown in FIG. 15. The image display device shown in FIG. 15 is caused to be of the configuration for separating white illumination light into three colors of red light, green light and blue light and converging them by holographic PDLC (polarization selective hologram optical element) as shown in FIG. 15. Similarly to the previously described holographic PDLC of two color separation, this holographic PDLC is laminated through barrier layers 16, 17 between hologram layers 33, 35, 42 of three layers for green light diffraction, blue light diffraction and red light diffraction in which diffraction acceptance angles and outgoing angles corresponding thereto are different from each other. This image display device is caused to be of the configuration in which the holographic PDLC is optically closely in contact with the reflection type perpendicular orientation liquid crystal element 18 through glass base (substrate) 19 having thickness of about 50 μm.

In this image display device, rays of outgoing light from the green light and blue light diffraction hologram layers 33, 35 positioned at the incident surface F side are converged in such a manner that three rays of color light cross each other in the state where they are not re-diffracted as far as possible by the blue light and red light diffraction hologram layers 35, 42 which are positioned at the outgoing surface H side. Rays of green light, blue light and red light are respectively converged onto corresponding color pixels of the reflection type perpendicular orientation liquid crystal element 18, and are reflected.

Figure 16:
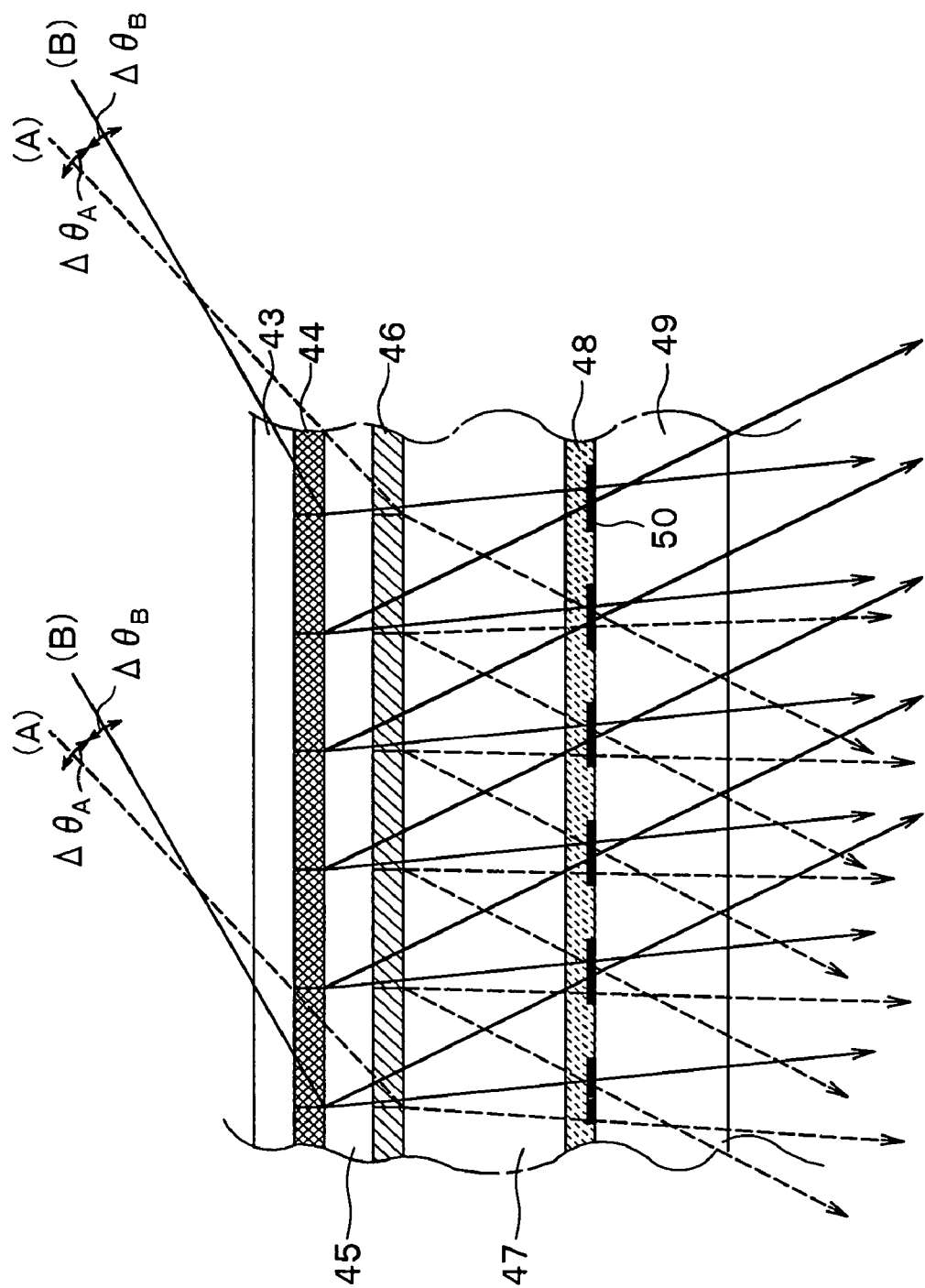
FIG. 16 is a longitudinal cross sectional view showing the configuration of a fifth embodiment of the image display device according to the present invention.

The fifth embodiment of the image display device according to the present invention in which illumination light incident angle of view has been improved in place of the ordinary micro-lens array used in the transmission type liquid crystal image display element will be explained with reference to FIG. 16.

Here, for convenience, consideration will be made on the assumption that rays of illumination light of any one of color light R, G, B is divided into illumination light (A) and illumination light (B) in dependency upon its incident angle. The illumination light (A) and the illumination light (B) are respectively rays of illumination light having angle ranges of $\pm\Delta\theta_A$, $\pm\Delta\theta_B$ with incident angles $\theta_A$, $\theta_B$ of 30° or more being as center, and the relationship of $\theta_A+\Delta\theta_A=\theta_B-\Delta\theta_B$ holds.

Illumination light incident from an incident side glass base (substrate) 43 is first incident on a first hologram lens array 44. At this time, the first hologram lens array 44 has a diffraction acceptance angle mainly corresponding to incident angle of illumination light (A), and serves to mainly diffract illumination light (A). This diffracted light is transmitted through a barrier layer 45, a second hologram lens array 46, a glass base (substrate) 47 with an opposite electrode, and a liquid crystal layer 48, and, every illumination light in which one side on the first hologram lens array 44 has size corresponding to pixel pitch, is converged into the area of TFF opening portions 50.

At the second hologram lens array 46 disposed through the barrier layer 45, illumination light (B) is mainly diffracted similar to the above. Also here, diffracted light is transmitted through the glass base (substrate) 47 with an opposite electrode and the liquid crystal layer 48, and, every illumination light in which one side on the second hologram lens array 46 has size corresponding to pixel pitch, is converged into areas of the TFT opening portions 50.

Namely, with respect to one TFF opening portion 50, illumination light is converged by two micro-lenses of the first hologram lens array 44 and the second hologram lens array 46. Further, since these first and second hologram lens arrays 44, 46 respectively behave as independent micro lens array, it is possible to ensure large acceptance angle as compared to the ordinary refraction type system micro lens array.

The first hologram lens array 44 and the second hologram lens array 46 which are used here do not both include material including anisotropy of refractive index. Accordingly, such hologram lens arrays do not have large polarization selectivity.

[4] Image display apparatus according to the present invention

Figure 17:
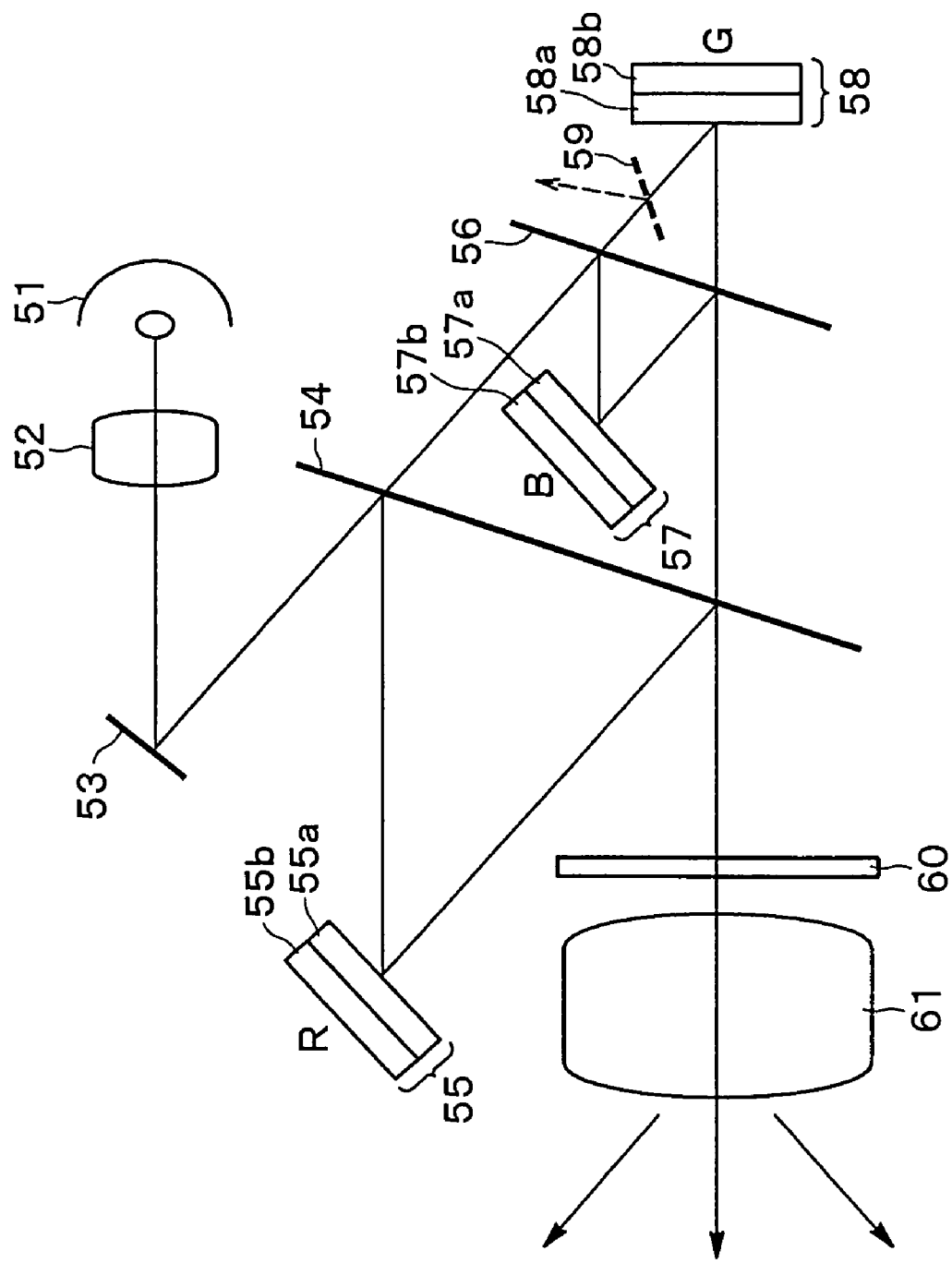
FIG. 17 is a plan view showing the configuration of a first embodiment of an image display apparatus according to the present invention.

The configuration and the operating principle of three plate system projection type image display apparatus in which three reflection type liquid crystal elements are used as an image display device and two dichroic mirrors are used as color separation/synthesis means as the image apparatus according to the present invention will be explained with reference to FIG. 17.

In this image display apparatus, light beams which have been emitted from a UHP lamp light source 51 are incident on an illumination optical system 52 having functions such as correction of the light beam cross sectional shape, uniformization of light intensity distribution and divergence angle control, etc. In this illumination optical system 52, a P-S polarization converter is included. This P-S converter has polarization converting means having a function to allow incident light beams in non-polarization state to be in correspondence with any one of P-polarized light and S-polarized light at efficiency of 50% or more. In the case of this embodiment, light beams which have been transmitted through the illumination optical system 52 are converted so that a polarization state results where the electric vector vibrates mainly in a direction in parallel to paper surface of FIG. 17, i.e., P-polarized light with respect to a mirror 53 which is subsequently incident.

The illumination light is reflected by the mirror 53, and is incident on a dichroic mirror 54 of red reflection. At this dichroic mirror 54, only red light is mainly reflected toward a spatial light modulation element 55 for red light. In this red light spatial light modulation element 55, red light is incident at an incident angle of about 50°±15°.

On the other hand, rays of blue light and green light which have been transmitted through the dichroic mirror 54 of red reflection are subsequently incident on a dichroic mirror 56 for blue light reflection. At this dichroic mirror 56 for blue light reflection, only blue light is reflected toward a spatial light modulation element 57 for blue light. At this blue light spatial light modulation element 57, blue light is incident at an incident angle of about 50°±15°.

Green light which has been transmitted through the blue light reflection dichroic mirror 56 is incident on a spatial light modulation element 58 for green light at an incident angle of about 50°±15°.

Here, on an optical path extending from the blue light reflection dichroic mirror 56 to the green light spatial light modulation element 58, an orange color cut filter 59 which reflects the spectrum of the long wave length side relative to wavelength of about 570 nm is disposed so that it can be inserted and withdrawn. In the case where there is a necessity to improve color reproducibility of display image, the orange color cut filter 59 is inserted onto the optical path. Further, in the case where there is a necessity that brightness is preferential as compared to color reproducibility, the orange color cut filter 59 is pulled out toward the outside of the optical path to thereby irradiate orange color light in the vicinity of 580 nm included in illumination light from the UHP lamp light source 51 onto the green light spatial light modulation element 58 so that contribution to image formation of display image is made.

The green light spatial light modulation element 58, the blue light spatial light modulation element 57 and the red light spatial light modulation element 55 are caused to be of the configuration in which polarization selective laminated type hologram optical elements 58a, 57a, 55a and reflection type spatial light modulation elements 58b, 57b, 55b are respectively combined as shown in the above-described first embodiment of the image display device. Accordingly, only rays of P-polarized light components of green light, blue light and red light having mainly P-polarized light component which are respectively incident on the green light spatial light modulation element 58, the blue light spatial light modulation element 57 and the red light spatial light modulation element 55 are diffracted. Thus, such rays of light are incident on the respective reflection type spatial light modulation elements 58b, 57b, 55b at an incident angle of about ±10°. Polarization states of green light, blue light and red light are modulated at every pixel of the respective reflection type spatial light modulation elements 58b, 57b, 55b. Thereafter, these rays of light are emitted into air from the polarization selective laminated type hologram optical elements 58a, 57a, 55a for a second time at an outgoing angle of ±15°.

It is to be noted that thicknesses of respective liquid crystal layers of the reflection type spatial light modulation elements 58b, 57b, 55b are optimized in accordance with differences of rays of color light respectively modulated.

The red light spatial light modulation element 55 and the green light spatial light modulation element 58 are disposed at conjugate positions with respect to the dichroic mirror 54 of red reflection. The blue light spatial light modulation element 57 and the green light spatial light modulation element 58 are disposed at conjugate positions with respect to the dichroic mirror 56 of blue reflection.

Accordingly, respective rays of illumination light of color light modulated by the green light spatial light modulation element 58, the blue light spatial light modulation element 57 and the red light spatial light modulation element 55 are color-synthesized for a second time by the dichroic mirror 56 of blue light reflection and the dichronic mirror 54 of red light reflection. This illumination light is incident on a projection optical system 61 via polarization selector means 60 through which S-polarized light is transmitted, e.g., polarization plate. The projection optical system 61 forms an image of illumination light which has been incident onto a screen (not shown). On the screen, the image is displayed.

It is to be noted that the blue light reflection dichroic mirror 56 and the red light reflection dichroic mirror 54 may be prepared so that the thin film characteristic of the portion for performing color separation and the thin film characteristic of the portion for performing color synthesis are different from each other.

Figure 18:
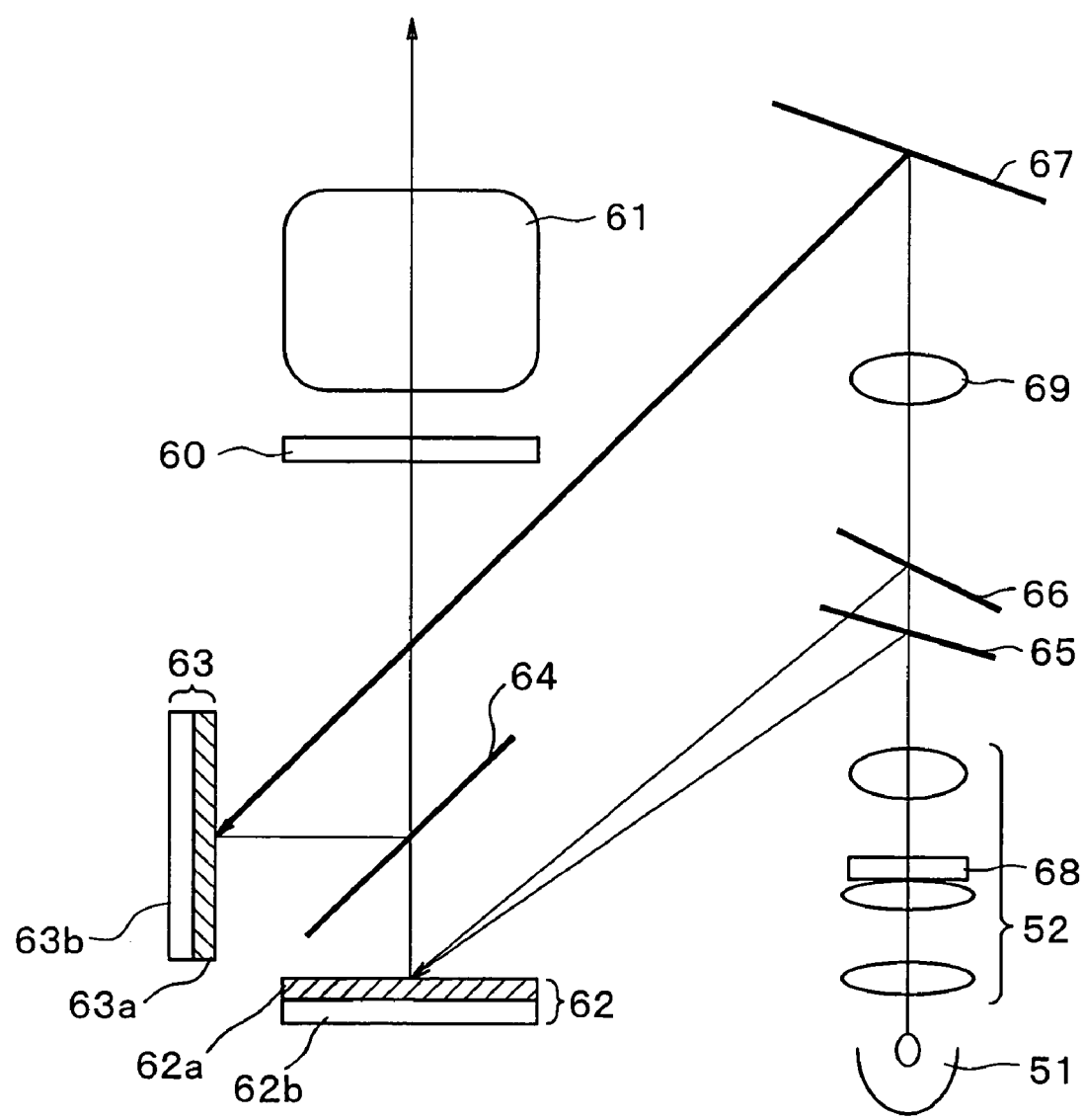
FIG. 18 is a plan view showing the configuration of a second embodiment of the image display apparatus according to the present invention.

The second embodiment of the image display apparatus according to the present invention is shown in FIG. 18. Explanation will be given as this image display apparatus in connection with the configuration and the operating principle of the two plate system projection type image display apparatus in which reflection type liquid crystal elements 62, 63 are used as the image display element, a dichroic mirror 64 is used as color synthesis means, dichroic mirrors 65, 66, 67 are used as color separation means with respect to two reflection type liquid crystal elements 62, 63, and a polarization selective laminated hologram optical element 62a is used as color separation/converging means with respect to one reflection type liquid crystal element 62 as shown in FIG. 18.

Illumination light beams emitted from the UHP lamp light source 51 are incident on the illumination optical system 52 having functions such as correction of the light beam cross sectional shape, uniformization of light intensity distribution and divergent angle control, etc. In this illumination optical system 52, there is included a P-S polarization converter 68. This P-S polarization converter 68 has polarization converting means having a function to allow light beams in non-polarization state to be in correspondence with any one of P-polarized light and S-polarized light at efficiency of 50% or more. In the case of this embodiment, illumination light beams which have been passed through the illumination optical system 52 are converted so that a polarization state results where the electric vector vibrates mainly in a direction in parallel to the paper surface of FIG. 18, i.e., P-polarized light with respect to dichroic mirror 65 of green reflection which is subsequently incident.

The green light component and the blue light component of the illumination light are reflected at the green reflection dichroic mirror 65 and the blue reflection dichroic mirror 66. Thus, such light components are incident on the green/blue reflection type display element 62 at angles different from each other. The incident angle of blue light is about 45°. The incident angle of green light is about 55°.

Rays of illumination light which have been transmitted through the green reflection dichroic mirror 65 and the blue reflection dichroic mirror 66 are reflected by the red reflection dichroic mirror 67 via a condenser lens 69, and are incident on the red reflection type display element 63 at incident angle of about 45°.

The green/blue reflection type display element 62 used in this embodiment is the same as the element described in the third embodiment of the image display device, and has the structure that polarization selective laminated hologram optical element 62a including plural hologram layers for converging blue light and green light onto color pixels respectively corresponding thereto and reflection type liquid crystal element 62b having two color pixels for blue and green are caused to be optically tightly in contact with each other.

The red reflection type display element 63 corresponds to the element in which the previously described transmission type liquid crystal element of the image display device is replaced by reflection type liquid crystal element, and has the structure that polarization selective laminated hologram optical element 63a including plural hologram layers for converging red light onto color pixels corresponding thereto and reflection type liquid crystal element 63b including color pixels for red are caused to be optically tightly in contact with each other.

The polarization state of rays of illumination light mainly consisting of the P-polarized light component which have been incident on respective reflection type display elements 62, 63 is modulated at every pixel. Thus, the rays of illumination light are reflected in the state where the polarization state has been modulated by respective reflection type display elements 62, 63. When the P-polarized light component is incident on the polarization selective laminated hologram optical elements 62a, 63a for a second time, the polarized light component is diffracted so that it is deflected. Also when the S-polarized light component is incident on the polarization selective laminated hologram optical elements 62a, 63a for a second time, it is transmitted through polarization selective laminated hologram optical elements 62a, 63a without being diffracted.

Two rays of modulated light consisting of the S-polarized light component which has been transmitted through the polarization selective laminated hologram optical elements 62a, 63a are color-synthesized at the dichroic mirror 64, and are then incident on the projection optical system 61 via the polarization plate 60 through which S-polarized light is transmitted. The projection optical system 61 forms an image of the illumination light which has been incident onto a screen (not shown). On the screen, an image is displayed.

Figure 19:
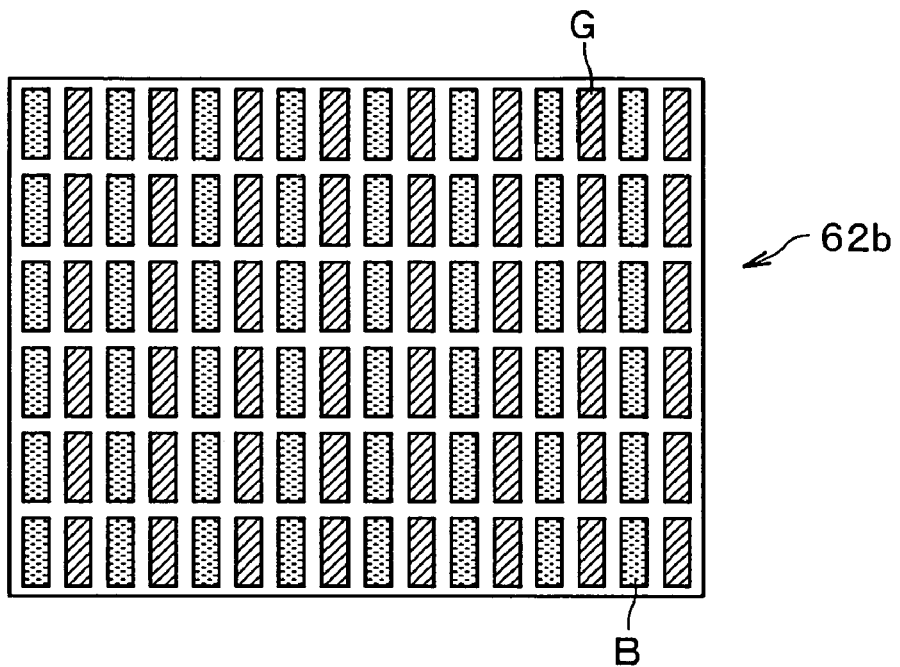
FIG. 19 is a front view showing pixel configuration of reflection type liquid crystal elements for blue and green in the image display apparatus.
Figure 20:
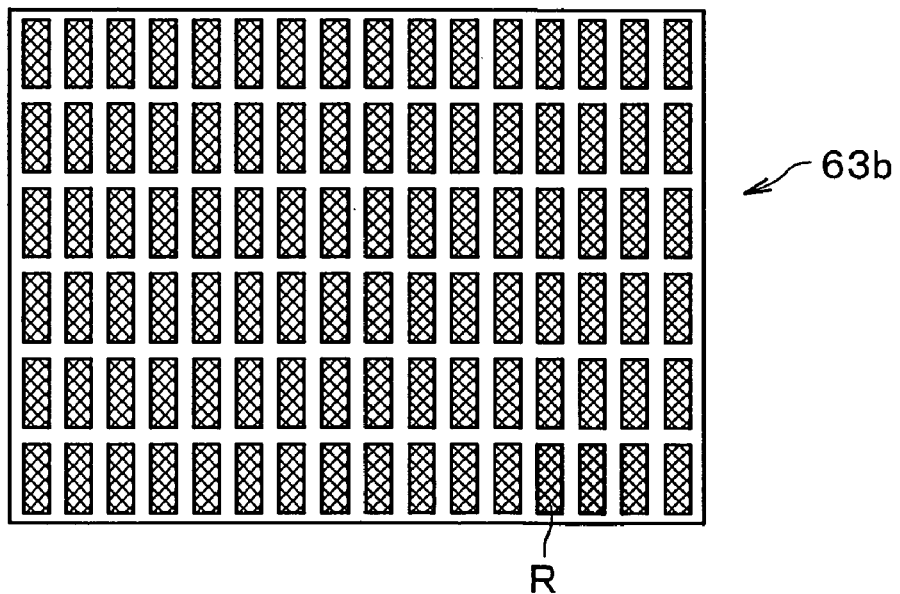
FIG. 20 is a front view showing pixel configuration of reflection type liquid crystal element for red in the image display apparatus.

As shown in FIG. 19, blue/green reflection type liquid crystal element 62b has the pixel structure in which pixels G for green and pixels B for blue are alternately arranged. As shown in FIG. 20, the red reflection type liquid crystal element 63b consists of only pixels R for red, and has the pixel structure equal to the blue/green reflection type liquid crystal element 62b. At this red reflection type liquid crystal element 63b, two basic pixels which form a pair are equally driven as one pixel.

It is to be noted that the thicknesses of respective liquid crystal layers at the reflection type spatial light modulation elements 62, 63 are respectively optimized in accordance with the difference of color light to be modulated.

Figure 21:
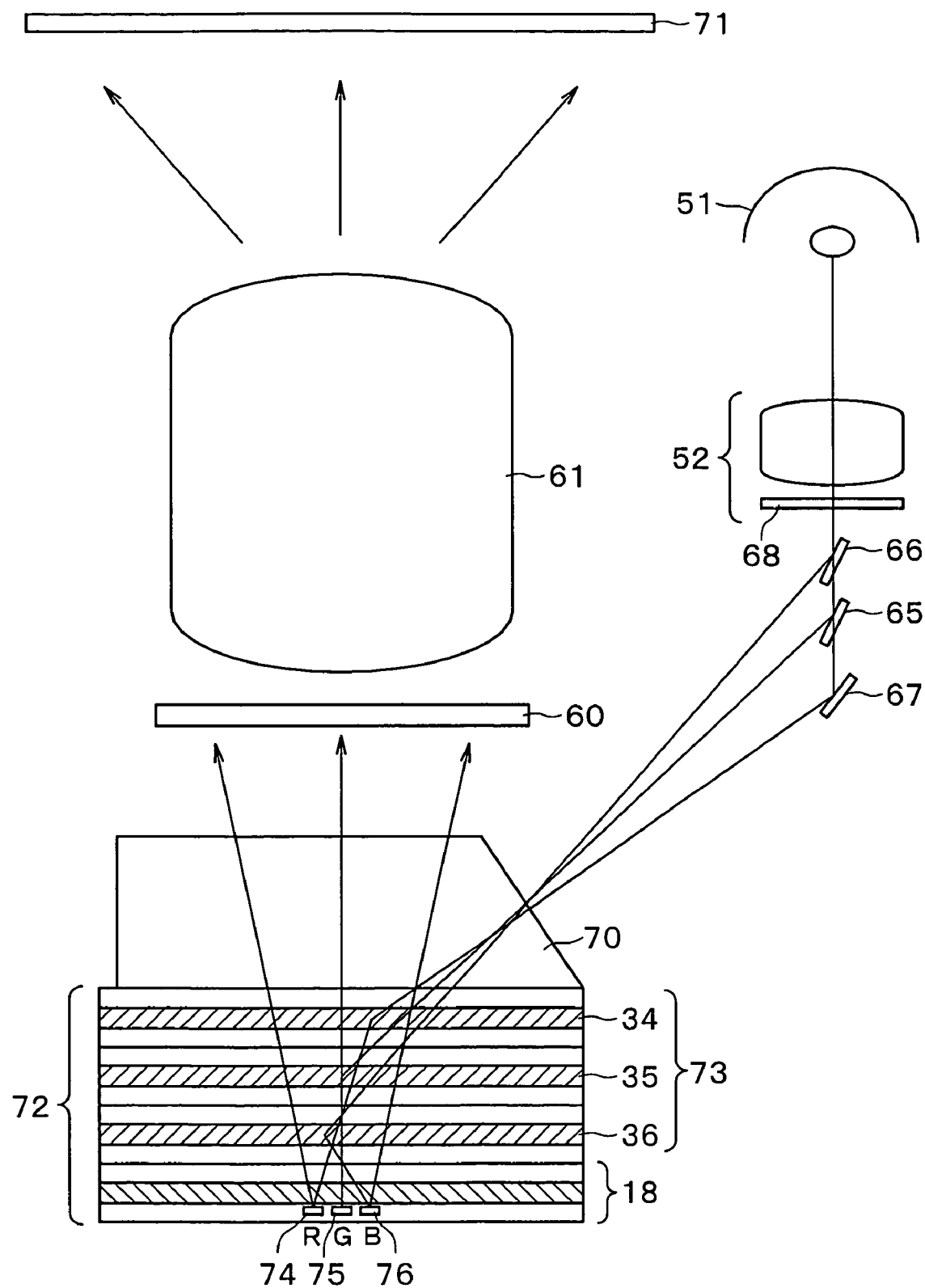
FIG. 21 is a plan view showing the configuration of a third embodiment of the image display apparatus according to the present invention.

The third embodiment of the image display apparatus according to the present invention is shown in FIG. 21.

The image display apparatus shown in FIG. 21 is directed to a single plate projection type image display apparatus, and uses a polarization selective laminated type hologram optical element as the color separation/converging means with respect to reflection type liquid crystal element 18. In this apparatus, illumination light beams emitted from the UHP lamp light source 51 are incident on the illumination optical system 52 having functions such as correction of light beam cross sectional shape, uniformization of light intensity distribution and divergence angle control, etc. In this illumination optical system 52, there is included P-S polarization converter 68. This P-S polarization converter 68 has polarization converting means having a function to allow light beams in non-polarization state to be in correspondence with any one of P-polarized light and S-polarized light at efficiency of 50% or more. In the case of this embodiment, light beams which have been transmitted through the illumination optical system 52 are converted so that a polarization state results where the electric vector vibrates mainly in a direction in parallel to paper surface of FIG. 21, i.e., P-polarized light with respect to dichroic mirrors 66, 65, 67 which is subsequently incident.

The blue component, green component and red component of the illumination light are respectively reflected at the blue reflection mirror dichroic mirror 66, the green reflection dichroic mirror 65 and the red reflection dichroic mirror 67. Respective components are incident at different angles on a reflection type display element 72 through a coupling prism 70.

This coupling prism 70 is attached in the state where it is optically tightly in contact with the reflection type display element 72 in order to allow the incident angle with respect to a polarization selective laminated type hologram optical element 73 of the reflection type display element 72 to have large value, e.g., about 55°.

The reflection type display element 72 used in this embodiment is essentially similar to the element shown in the fourth embodiment of the image display device. The polarization selective laminated type hologram optical element 73 used here is a holographic PDLC optical element, and serves to diffract P-polarized light, but not to diffract S-polarized light. The holograms 34, 35, 36 for respective rays of color light of R, G, B have the structure in which three layers are laminated, and are constituted integrally with the reflection type liquid crystal element 18.

The respective color hologram layers 34, 35, 36 have a function of a cylindrical lens having converging force with respect to only one direction so that rays of illumination light are converged onto corresponding respective color fundamental pixels of the reflection type liquid crystal element 18 in a crossing manner.

Rays of illumination light which have been color-separated and converged with respect to respective color pixel electrodes 74, 75, 76 of R, G, B by the respective color hologram layers 34, 35, 36 are reflected in the state where polarization states thereof are modulated. When the S-polarized light component of rays of this reflected light is incident on the respective color light hologram layers 34, 35, 36 for a second time, the light component is emitted with a predetermined outgoing angle with respect to the reflection type display element 72 without being diffracted.

This reflected light is detected by the polarization plate 60 through which S-polarized light is transmitted, and is incident on the projection optical system 61. The projection optical system 61 forms an image of incident illumination light on a screen 71. On the screen 71, an image is displayed.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined in the appended claims.

INDUSTRIAL APPLICABILITY

As described above, in the present invention, plural transmission type hologram optical elements in which diffraction acceptance angles are different from each other and outgoing angles with respect to center incident angles of diffraction acceptance incident angles at an arbitrary wavelength of the visible region are different from each other are laminated to thereby realize a transmission type laminated hologram optical device in which diffraction acceptance angle of incident light is broad.

In the image display device according to the present invention, respective transmission type hologram optical elements are constituted as a color image display device including a hologram color filter by combining a transmission type laminated hologram optical element having the function of a micro-lens array and a spatial light modulation element having color pixels. Accordingly, this image display device is constituted as an image display device having high light utilization efficiency as compared to a color filter of the absorption type using coloring matter, a hologram color filter of the single layer structure or a hologram color filter in which laminated structure is provided, but mutual diffraction acceptance angles and outgoing angles are not sufficiently separated.

Even in the case where respective transmission type hologram optical elements do not function as a color filter, this image display device is used as an alternative to a micro-lens array conventionally used along with a transmission type liquid crystal image display element, thereby making it possible to constitute such an image display device as an image display device in which the taking-in angle of view of illumination light is broad so that high light utilization efficiency is provided.

In this image display device, only one color from R (Red), G (Green) and B (Blue) light of the rays of color light is caused to be incident at the diffraction acceptance angle on plural transmission type hologram optical elements in which diffraction acceptance angles are different from each other to thereby permit color separation which does not utilize wavelength dispersion of the hologram.

Thus, degree of freedom can be obtained at the separation angle setting of respective rays of color light, and distance between the hologram color filter and color pixels of the spatial light modulation element can be set to optimum distance from the viewpoints of manufacturing difficulty and/or light utilization efficiency. In the case where it is the premise that the spatial light modulation element of the same pixel pitch is employed, particularly separation angles of respective rays of color light are caused to be large, thereby making it possible to set the distance between the hologram color filter and the color pixels of the spatial light modulation element to, e.g., 50 μm or less. Further, realization of a wide angle of view and realization of a broad-band of illumination light with respect to the hologram color filter are provided so that a bright image display device in which light utilization efficiency has been improved can be realized.

Respective hologram layers of the transmission type laminated hologram optical element are caused to be a polarization selective hologram optical element, thereby making it possible to realize a polarization separation element of broad acceptance angle.

The image display apparatus according to the present invention uses the above-described transmission type laminated hologram optical element and the reflection type spatial light modulation element, and is thus constituted as a small image display apparatus of light weight, high efficiency and low cost which does not require PBS (Polarization Beam Splitter).

In this image display apparatus, a color filter function by a micro-lens array is added, thereby making it possible to constitute this apparatus as a compact image display apparatus which does not require color synthesis means, and has low cost.

The present invention can provide a transmission type laminated hologram optical element which can broaden the diffraction acceptance angle of incident light so that light utilization efficiency is permitted to be high, and can optimally set the distance with respect to the color pixels of the spatial light modulation element from viewpoints of manufacturing difficulty and/or light utilization efficiency, and can provide an image display device and an image display apparatus which can display a bright image by using such a transmission type laminated hologram optical element.

The invention claimed is:

1. A transmission type laminated hologram optical element caused to be of the configuration in which a plurality of transmission type hologram optical elements having diffraction acceptance incident angles different from each other are laminated,
    wherein each of said respective transmission type hologram optical elements are a polarization selective hologram optical element having a structure in that plural regions where incident polarization azimuth dependencies of a refractive index are different from each other are arranged in order,
    wherein each of said respective transmission type hologram optical elements are a polarization selective hologram optical element including a polymer dispersion liquid crystal material.

2. The transmission type laminated hologram optical element as set forth in claim 1,
    wherein each of said respective transmission type hologram optical elements are a polarization selective hologram optical element having a structure in that two regions where incident polarization azimuth dependencies of a refractive index are different from each other are arranged in order.

3. A transmission type laminated hologram optical element caused to be of the configuration in which a plurality of transmission type hologram optical elements having diffraction acceptance incident angles different from each other are laminated,
    wherein each of said respective transmission type hologram optical elements are a polarization selective hologram optical element having a structure in that plural regions where incident polarization azimuth dependencies of a refractive index are different from each other are arranged in order,
    wherein the transmission type hologram optical elements constitute a micro-lens array.

4. The transmission type laminated hologram optical element as set forth in claim 3,
    wherein the number of layers of the transmission type hologram optical elements is 3 or more.

5. A transmission type laminated hologram optical element caused to be of the configuration in which a plurality of transmission type hologram optical elements having diffraction acceptance incident angles different from each other are laminated,
    wherein each of said respective transmission type hologram optical elements are a polarization selective hologram optical element having a structure in that plural regions where incident polarization azimuth dependencies of a refractive index are different from each other are arranged in order,
    wherein the respective transmission type hologram optical elements are adapted so that outgoing angles with respect to center incident angles of respective diffraction acceptance incident angles at an arbitrary wavelength of the visible region are different from each other by 5 degrees or more.

6. An image display device comprising:
    a transmission type laminated hologram optical element, and
    a spatial light modulation element for modulating outgoing light from the transmission type laminated hologram optical element,
    wherein the transmission type laminated hologram optical element is caused to be of the configuration such that a plurality of transmission type hologram optical elements in which diffraction acceptance incident angles are different from each other and outgoing angles with respect to center incident angles of respective diffraction acceptance incident angles at an arbitrary wavelength of the visible region are different from each other are laminated.

7. The image display device as set forth in claim 6,
    wherein the respective transmission type hologram optical elements are adapted so that an outgoing angle range corresponding to an arbitrary incident angle range within the diffraction acceptance incident angle is smaller than said incident angle range.

8. The image display device as set forth in claim 6,
    wherein each of said respective transmission type hologram optical elements are a polarization selective hologram optical element having a structure in that two regions where incident polarization azimuth dependencies of a refractive index are different from each other are arranged in order.

9. The image display device as set forth in claim 6,
wherein each of said respective transmission type hologram optical elements are a polarization selective hologram optical element including a polymer dispersion liquid crystal material.

10. The image display device as set forth in claim 6,
wherein the transmission type hologram optical element has a converging function.

11. The image display device as set forth in claim 6,
wherein the respective transmission type hologram optical elements constitute a micro-lens array, and serves to converge illumination light onto respective pixels corresponding to spatial light modulation elements.

12. The image display device as set forth in claim 11,
wherein at least one set or more of rays of main light of illumination light converged onto corresponding respective pixels of the spatial light modulation elements from the respective transmission type hologram optical elements.

13. The image display device as set forth in claim 6,
wherein the transmission type hologram optical elements constitute a micro-lens array, and has a color filter function to converge illumination light onto corresponding respective color pixels of the spatial light modulation elements in the state where they are color-separated.

14. The image display device as set forth in claim 13,
wherein at least one set or more of main rays of light of respective rays of color light of illumination light converge onto corresponding respective color pixels of the spatial light modulation elements from the respective transmission type hologram optical elements.

15. The image display device as set forth in claim 6,
wherein the number of layers of the transmission hologram optical elements is 3 or more.

16. The image display device as set forth in claim 6,
wherein the respective transmission type hologram optical elements are adapted so that outgoing angles with respect to center incident angles of respective diffraction acceptance incident angles at an arbitrary wavelength of the visible region are different from each other by 5 degrees or more.

17. The image display device as set forth in claim 6,
wherein the spatial light modulation element is a reflection type spatial light modulation element, and serves to modulate illumination light which has been incident from the transmission type hologram optical element of the transmission type laminated hologram optical element to allow the modulated illumination light to be incident on the transmission type laminated hologram optical element for a second time.

18. The image display device as set forth in claim 6,
wherein a hologram surface of the transmission type laminated hologram optical element and a light modulation surface of the spatial light modulation element are caused to be in parallel to each other.

19. The image display device as set forth in claim 6,
wherein a spacing between a hologram surface of the transmission type laminated hologram optical element and a light modulation surface of the spatial light modulation element is 50 μm or less.

20. An image display apparatus comprising:
an illumination light source for emitting illumination light;
a transmission type laminated hologram optical element for diffracting incident light;
an illumination optical system for guiding the illumination light to the transmission type laminated hologram optical element as incident light;
a spatial light modulation element for modulating illumination light which has been emitted from the transmission type laminated hologram optical element; and
a magnification optical system for magnifying the illumination light which has been modulated by the spatial light modulation element to form an image thereof,
wherein the transmission type laminated hologram optical element is caused to be of the configuration such that a plurality of transmission type hologram optical elements in which diffraction acceptance incident angles are different from each other, and outgoing angles with respect to center incident angles of respective diffraction acceptance incident angles at an arbitrary wavelength of the visible region are different from each other are laminated.

21. The image display apparatus as set forth in claim 20,
wherein the respective transmission type hologram optical elements are adapted so that an outgoing angle range corresponding to an arbitrary incident angle range within a diffraction acceptance incident angle is smaller than said incident angle range.

22. The image display apparatus as set forth in claim 20,
wherein the transmission type laminated hologram optical element is adapted so that an illumination light is caused to be incident at an incident angle from more than 30 degrees to less than 90 degrees by an illumination optical system, diffraction efficiency of illumination light which is a first polarization azimuth of rays of incident illumination light is 50% or more, and diffraction efficiency of illumination light of a second polarization azimuth perpendicular to the first polarization azimuth is 10% or less.

23. The image display apparatus as set forth in claim 22,
wherein the first polarization azimuth is P-polarized light.

24. The image display apparatus as set forth in claim 20,
wherein each of said respective transmission type hologram optical elements are a polarization selective hologram optical element having a structure in that two regions where incident polarization dependencies of refractive index are different from each other are arranged in order.

25. The image display apparatus as set forth in claim 20,
wherein each of said respective transmission type hologram optical elements are a polarization selective hologram optical element including a polymer dispersion liquid crystal material.

26. The image display apparatus as set forth in claim 20,
wherein the transmission type hologram optical element has a converging function.

27. The image display apparatus as set forth in claim 20,
wherein the transmission type hologram optical elements constitute a micro-lens array, and serves to converge illumination light onto corresponding respective pixels of the spatial light modulation element.

28. The image display apparatus as set forth in claim 27,
wherein at least one set or more of rays of main light of illumination light converged onto corresponding respective pixels of the spatial light modulation element from the respective transmission type hologram optical elements are crossed with each other.

29. The image display apparatus as set forth in claim 20,
wherein the transmission type hologram optical elements constitute a micro-lens array, and have a color filter function to converge illumination light onto corresponding respective color pixels of the spatial light modulation element in the state where they are color-separated.

30. The image display apparatus as set forth in claim 29, wherein at least one set or more of rays of main light of respective rays of color light of illumination light converged onto corresponding respective color pixels of the spatial light modulation element from the respective transmission type hologram optical elements are crossed with each other.

31. The image display apparatus as set forth in claim 29, wherein the illumination optical system allows rays of color light different from each other of illumination light to be incident on respective transmission type hologram optical elements at diffraction acceptance angles of the respective transmission type hologram optical elements to thereby conduct color separation and convergence of the illumination light.

32. The image display apparatus as set forth in claim 20, wherein the number of layers of the transmission type hologram optical elements is 3 or more.

33. The image display apparatus as set forth in claim 20, wherein the respective transmission type hologram optical elements are adapted so that outgoing angles with respect to center incident angles of respective diffraction acceptance incident angles at an arbitrary wavelength of the visible region are different from each other by 5 degrees or more.

34. The image display apparatus as set forth in claim 20, wherein the spatial light modulation element is a reflection type spatial light modulation element.

35. The image display apparatus as set forth in claim 20, wherein a hologram surface of the transmission type laminated hologram optical element and a light modulation surface of the spatial light modulation element are caused to be in parallel to each other.

36. The image display apparatus as set forth in claim 20, wherein a spacing between a hologram surface of the transmission type laminated hologram optical element and a light modulation surface of the spatial light modulation element is 50 μm or less.

37. The image display apparatus as set forth in claim 20, wherein the transmission type laminated hologram optical element serves to allow rays of main light of illumination light to be obliquely incident on the spatial light modulation element.

38. The image display apparatus as set forth in claim 20, wherein the illumination optical system includes color separation means, and serves to allow only a portion of a spectrum of illumination light to be incident on the transmission type laminated hologram optical element.

39. The image display apparatus as set forth in claim 20, wherein the illumination optical system includes color-separation means, and serves to allow rays of light of different plural wavelength bands within a spectrum of illumination light to be incident at incident angles different from each other with respect to at least one transmission type hologram optical element.

40. The image display apparatus as set forth in claim 39, wherein rays of light of different wavelength bands which are incident on the transmission type hologram optical element are blue light and green light.

41. The image display apparatus as set forth in claim 39, wherein rays of light of different wavelength bands which are incident on the transmission type hologram optical element are blue light and red light.

42. The image display apparatus as set forth in claim 20, which comprises polarization selector means in an optical path between the spatial light modulation element and a projection optical system.

43. An image display apparatus comprising:
an illumination light source for emitting illumination light;
a transmission type polarization selective hologram optical element having a structure in that two regions where incident polarization azimuth dependencies of a refractive index are different from each other are arranged in order, and caused to be of the configuration such that a plurality of transmission type hologram optical elements in which diffraction acceptance incident angles are different from each other are laminated to diffract incident light;
an illumination optical system for guiding the illumination light to allow it to be incident on the transmission type polarization selective hologram optical element at an incident angle from more than 30° to less than 90° with respect to a normal of the illumination light receiving surface of the transmission type polarization selective hologram optical element;
a reflection type spatial light modulation element for modulating a polarization state of illumination light which has been diffracted by the transmission type polarization selective hologram optical element; and
a magnification optical system for magnifying a display image which has been modulated by the reflection type spatial light modulation element,
wherein respective transmission type hologram optical elements constituting the transmission type polarization selective hologram optical element are adapted so that outgoing angles with respect to center incident angles of respective diffraction acceptance incident angles at an arbitrary wavelength of the visible region are different from each other, and serves to diffract a P-polarized light component or an S-polarized light component of illumination light to be received mainly toward the reflection type spatial modulation element and to allow diffraction efficiency with respect to a polarization component perpendicular to a polarization component which is mainly diffracted at the first incidence of rays of illumination light which are re-incident after having undergone a phase modulation by the reflection type spatial light modulation element to be 10% or less so that 70% of the component or more is transmitted.

44. The image display apparatus as set forth in claim 43, wherein the respective transmission type hologram optical elements are adapted so that an outgoing angle range corresponding to an arbitrary incident angle range within said diffraction acceptance incident angle is smaller than said incident angle range.

45. The image display apparatus as set forth in claim 43, wherein a first polarization azimuth is P-polarized light.

46. The image display apparatus as set forth in claim 43, wherein each of said respective transmission type hologram optical elements is said polarization selective hologram optical element including a polymer dispersion liquid crystal material.

47. The image display apparatus as set forth in claim 43, wherein the transmission type hologram optical element has a convergence function.

48. The image display apparatus as set forth in claim 43, wherein the number of layers of the transmission type hologram optical elements is 3 or more.

49. The image display apparatus as set forth in claim 43, wherein the respective transmission type hologram optical elements are adapted so that outgoing angles with respect to center incident angles of respective diffraction acceptance incident angles at an arbitrary wavelength of the visible region are different from each other by 5 degrees or more.

50. The image display apparatus as set forth in claim 43, wherein the respective transmission type hologram optical elements constitute a micro-lens array, and serves to converge illumination light onto corresponding respective pixels of the spatial light modulation element.

51. The image display apparatus as set forth in claim 50, wherein at least one set or more of rays of main light of illumination light converged onto corresponding respective pixels of the spatial light modulation element from the respective transmission type hologram optical elements are crossed with each other.

52. The image display apparatus as set forth in claim 43, wherein the transmission type hologram optical elements constitute a micro-lens array, and have a color filter function to converge illumination light onto corresponding respective color pixels of the spatial light modulation element in the state where they are color-separated.

53. The image display apparatus as set forth in claim 52, wherein at least one set or more of rays of main light of respective rays of color light of illumination light converged onto corresponding respective color pixels of the spatial light modulation element from the respective transmission type hologram optical elements are crossed with each other.

54. The image display apparatus as set forth in claim 52, wherein the illumination optical system allows rays of color light different from each other of illumination light to be incident on the respective transmission type hologram optical elements at diffraction acceptance angles of the respective transmission type hologram optical elements to thereby conduct color separation and convergence of the illumination light.

55. The image display apparatus as set forth in claim 43, wherein a hologram surface of the transmission type polarization selective hologram optical element and a light modulation surface of the spatial light modulation element are caused to be in parallel to each other.

56. The image display apparatus as set forth in claim 43, wherein a spacing between a hologram surface of the transmission type polarization selective hologram optical element and a light modulation surface of the spatial light modulation element is 50 μm or less.

57. The image display apparatus as set forth in claim 43, wherein the transmission type polarization selective hologram optical element allow rays of main light of illumination light to be obliquely incident on the reflection type spatial light modulation element.

58. The image display apparatus as set forth in claim 43, wherein the illumination optical system includes color separation means, and serves to allow only a portion of a spectrum of illumination light to be incident on the transmission type polarization selective hologram optical element.

59. The image display apparatus as set forth in claim 43, wherein the illumination optical system includes color separation means, and serves to allow rays of light of different plural wavelength bands within a spectrum of illumination light to be incident at incident angles different from each other on at least one transmission type hologram optical element.

60. The image display apparatus as set forth in claim 59, wherein rays of light of different wavelength bands which are incident on the transmission type hologram optical element are blue light and green light.

61. The image display apparatus as set forth in claim 59, wherein rays of light of different wavelength bands which are incident on the transmission type hologram optical element are blue light and red light.

62. The image display apparatus as set forth in claim 43, which comprises polarization selector means in an optical path between the spatial light modulation element and a projection optical system.

* * * * *

UNITED STATES PATENT AND TRADEMARK OFFICE
CERTIFICATE OF CORRECTION

| | | |
|---|---|---|
| PATENT NO. | : 7,139,109 B2 | Page 1 of 1 |
| APPLICATION NO. | : 10/492590 | |
| DATED | : November 21, 2006 | |
| INVENTOR(S) | : Hiroshi Mukawa | |

It is certified that error appears in the above-identified patent and that said Letters Patent is hereby corrected as shown below:

<u>Title Page: and column 1, line 1:</u>
Item (54) should be read as follows:
-- TRANSMISSION TYPE LAMINATED HOLOGRAM OPTICAL ELEMENT AND IMAGE DISPLAY APPARATUS USING SUCH ELEMENT --.

Signed and Sealed this

Fifth Day of June, 2007

JON W. DUDAS
*Director of the United States Patent and Trademark Office*